US012262176B2

(12) United States Patent
Umezawa et al.

(10) Patent No.: US 12,262,176 B2
(45) Date of Patent: Mar. 25, 2025

(54) TRANSDUCER

(71) Applicant: Murata Manufacturing Co., Ltd., Nagaokakyo (JP)

(72) Inventors: Seiji Umezawa, Nagaokakyo (JP); Shinsuke Ikeuchi, Nagaokakyo (JP); Masayuki Suzuki, Nagaokakyo (JP); Matti Liukku, Nagaokakyo (JP); Ville-Pekka Rytkönen, Nagaokakyo (JP); Anssi Blomqvist, Nagaokakyo (JP); Ville Kaajakari, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 247 days.

(21) Appl. No.: 18/109,900

(22) Filed: Feb. 15, 2023

(65) Prior Publication Data

US 2023/0199405 A1 Jun. 22, 2023

Related U.S. Application Data

(63) Continuation of application No. PCT/JP2021/028286, filed on Jul. 30, 2021.

(30) Foreign Application Priority Data

Sep. 7, 2020 (JP) ................................ 2020-149663

(51) Int. Cl.
*H04R 17/02* (2006.01)

(52) U.S. Cl.
CPC .................................. *H04R 17/02* (2013.01)

(58) Field of Classification Search
CPC ................................ H04R 17/00; H04R 17/02
See application file for complete search history.

(56) References Cited

U.S. PATENT DOCUMENTS 10,293,377 B2 * 5/2019 Guedes .................. H10N 30/08
10,964,880 B2 * 3/2021 Grosh .................. H10N 30/306
2002/0186860 A1 12/2002 Ogura et al.
2019/0110132 A1 4/2019 Littrell
2021/0202824 A1 7/2021 Kurokawa et al.

FOREIGN PATENT DOCUMENTS

JP 2001-160999 A 6/2001
WO 2016/054447 A1 4/2016
WO 2020/121609 A1 6/2020

OTHER PUBLICATIONS

Official Communication issued in International Patent Application No. PCT/JP2021/028286, mailed on Oct. 12, 2021.

* cited by examiner

*Primary Examiner* — Brian Ensey
(74) *Attorney, Agent, or Firm* — Keating & Bennett, LLP

(57) ABSTRACT

A transducer includes a first connection portion connecting a first tip and a second tip to each other. The first connection portion is surrounded by a split slit connecting a center of the first tip, a center of a base, and a center of the second tip, the first tip, and the second tip.

21 Claims, 18 Drawing Sheets

TRANSDUCER

CROSS REFERENCE TO RELATED APPLICATIONS

This application claims the benefit of priority to Japanese Patent Application No. 2020-149663 filed on Sep. 7, 2020 and is a Continuation application of PCT Application No. PCT/JP2021/028286 filed on Jul. 30, 2021. The entire contents of each application are hereby incorporated herein by reference.

BACKGROUND OF THE INVENTION

1. Field of the Invention

The present invention relates to a transducer, and in particular, to an acoustic transducer which can be used as a sound wave transmitter that emits a sound wave and a sound wave receiver (microphone) that receives the sound wave. In particular, the present invention relates to an ultrasonic transmitter-receiver capable of transmitting and receiving an ultrasonic wave.

2. Description of the Related Art

U.S. Patent Application Publication No. 2019/0110132 discloses a configuration of a transducer. The transducer disclosed in U.S. Patent Application Publication No. 2019/0110132 includes a plurality of plates and a plurality of springs. Each of the plurality of springs connects two adjacent plates to each other. Each of the plurality of springs includes a first spring arm and a second spring arm sandwiching a gap between two adjacent plates. Each of the first spring arm and the second spring arm includes a portion surrounding an etched portion of the plate.

In the transducer disclosed in U.S. Patent Application Publication No. 2019/0110132, plates adjacent to each other at a position between a fixed end and a tip of a plate as a beam are connected by a spring. When the adjacent beams are connected to each other at a position between the fixed end and the tip of the beam, it is difficult to perform resonant vibration by synchronizing the entire beam including the tip of each of the plurality of beams.

SUMMARY OF THE INVENTION

Preferred embodiments of the present invention provide transducers that are each able to perform resonant vibration by synchronizing an entire beam including a tip of each of a plurality of beams.

A transducer according to a preferred embodiment of the present invention includes an annular base, a first beam, a second beam, and a first connection portion. The first beam includes a first fixed end connected to the base, and a first tip located closer to a center of the base on a side opposite to the first fixed end, and extending from the first fixed end towards the first tip. The second beam includes a second fixed end adjacent to the first beam in a circumferential direction of the base and connected to the base and a second tip located closer to the center of the base on a side opposite to the second fixed end, and extending from the second fixed end towards the second tip. The first connection portion connects the first tip and the second tip to each other. The first connection portion is surrounded by a split slit connecting a center of the first tip, the center of the base, and a center of the second tip, the first tip, and the second tip.

According to preferred embodiments of the present invention, an entire beam including a tip of each of a plurality of beams is able to be synchronized and resonantly vibrated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
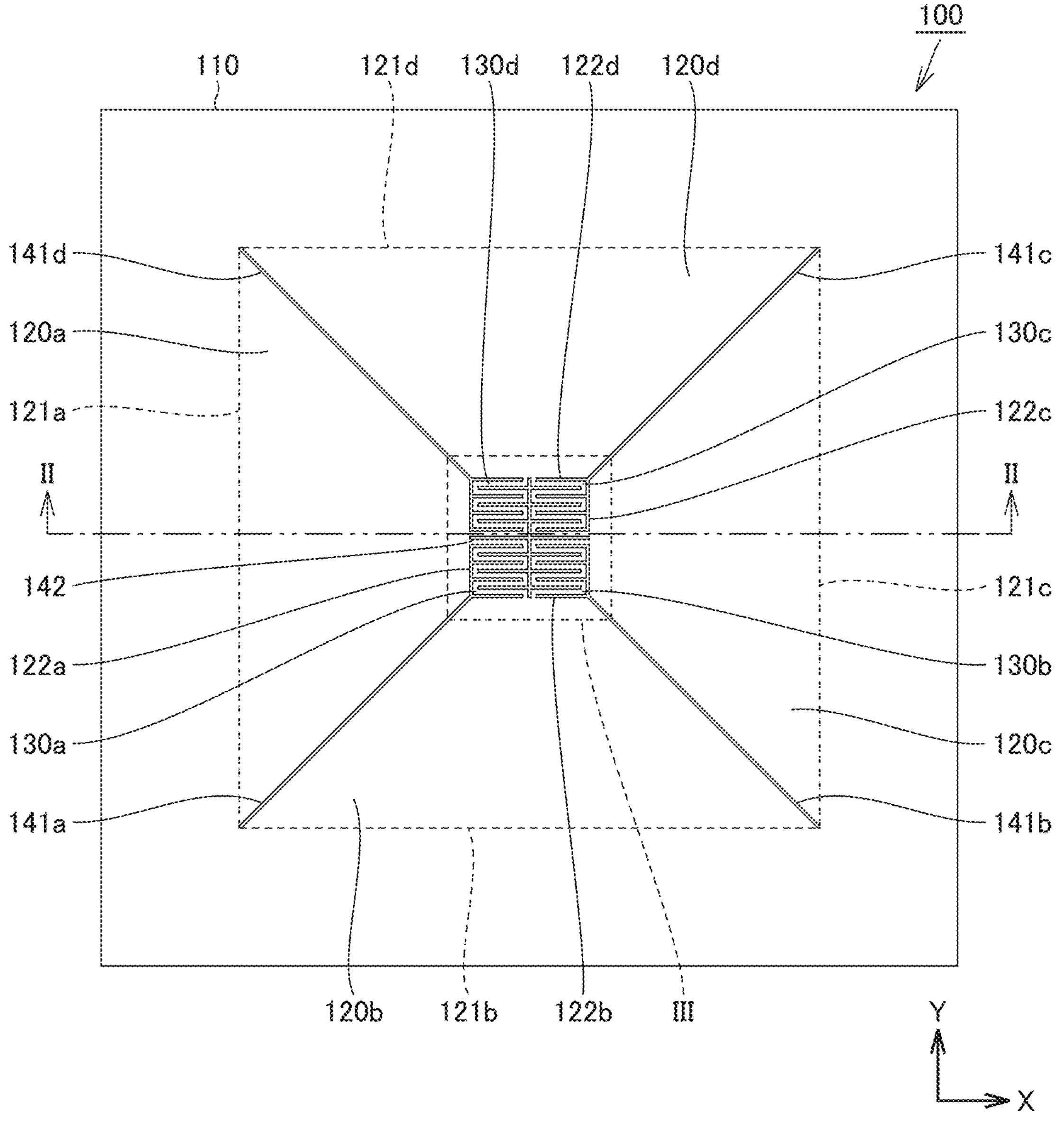
FIG. 1 is a plan view illustrating a transducer according to a preferred embodiment of the present invention.

With reference to the drawings, transducers according to preferred embodiments of the present invention will be described below. In the following description of preferred embodiments, the same or corresponding elements and portions in the drawings are denoted by the same reference numeral, and the description will not be repeated. In the following description, a center of a base 110 is a position including a center C and the vicinity of center C of base 110 described later.

Figure 2:
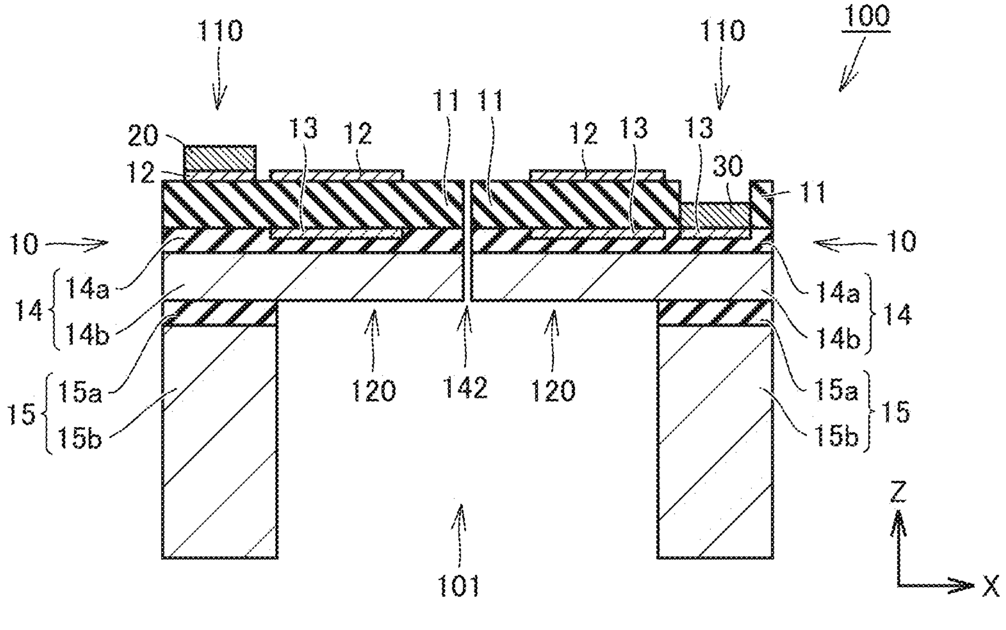
FIG. 2 is a sectional view illustrating the transducer in FIG. 1 as viewed from an arrow direction of a line II-II.
Figure 3:
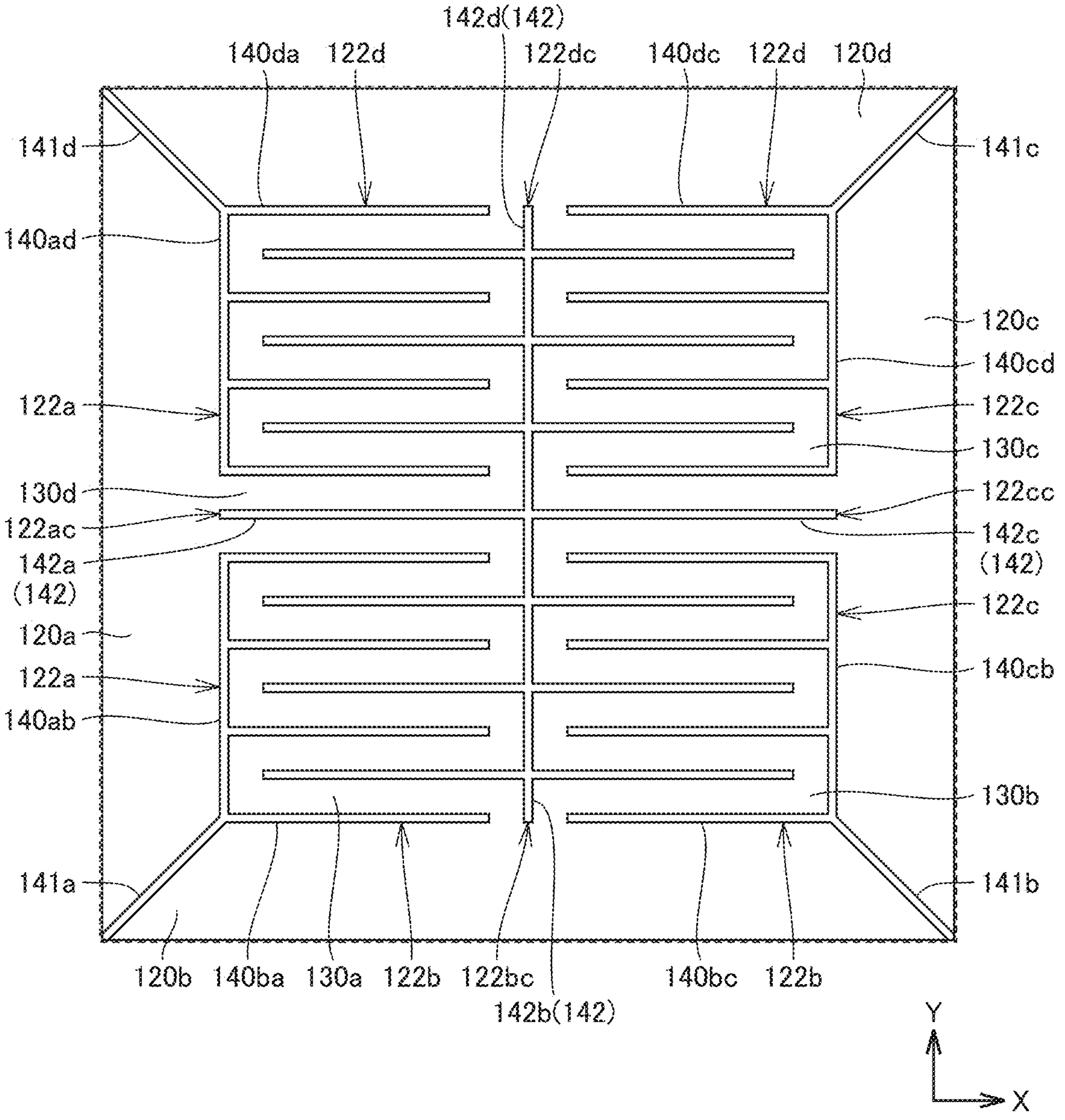
FIG. 3 is an enlarged partial plan view illustrating a portion III in FIG. 1.

FIG. 1 is a plan view illustrating the transducer according to a preferred embodiment of the present invention. FIG. 2 is a sectional view illustrating the transducer in FIG. 1 as viewed from an arrow direction of a line II-II. FIG. 3 is an enlarged partial plan view illustrating a portion III in FIG. 1.

As illustrated in FIGS. 1 to 3, a transducer 100 of a preferred embodiment of the present invention includes annular base 110, a first beam 120*a*, a second beam 120*b*, and a first connection portion 130*a*. Transducer 100 further includes a third beam 120*c*, a fourth beam 120*d*, a second connection portion 130*b*, a third connection portion 130*c*, and a fourth connection portion 130*d*. Transducer 100 of the present preferred embodiment can be used as an ultrasonic transducer in which each of a plurality of beams can perform bending vibration.

Base 110 has an annular shape when viewed from a multilayer direction of a plurality of layers described later, and specifically, has, for example, a rectangular or substantially rectangular annular shape. The shape of base 110 when viewed from the multilayer direction is not particularly limited as long as the shape of base 110 is annular. When viewed from the multilayer direction, an outer peripheral side surface of base 110 may have, for example, a polygonal shape or a circular shape, and an inner peripheral side surface of base 110 may have a polygonal shape or a circular shape.

As illustrated in FIG. 1, first beam 120*a* includes a first fixed end 121*a* connected to base 110 and a first tip 122*a* located closer to the center of base 110 on the side opposite to first fixed end 121*a*, and first beam 120*a* extends from first fixed end 121*a* towards first tip 122*a*.

Second beam 120*b* includes a second fixed end 121*b* adjacent to first beam 120*a* in a circumferential direction of base 110 and connected to base 110 and a second tip 122*b* located closer the center of base 110 on the side opposite to second fixed end 121*b*, and second beam 120*b* extends from second fixed end 121*b* towards second tip 122*b*.

Third beam 120*c* includes a third fixed end 121*c* adjacent to second beam 120*b* in the circumferential direction of base 110 and connected to base 110, and a third tip 122*c* located closer to the center of base 110 on the opposite side of third fixed end 121*c*, and third beam 120*c* extends from third fixed end 121*c* towards the third tip 122*c*.

Fourth beam 120*d* includes a fourth fixed end 121*d* adjacent to each of third beam 120*c* and first beam 120*a* in the circumferential direction of base 110 and connected to base 110 and a fourth tip 122*d* located closer the center of base 110 on the side opposite to fourth fixed end 121*d*, and fourth beam 120*d* extends from fourth fixed end 121*d* towards fourth tip 122*d*.

Each of first beam 120*a*, second beam 120*b*, third beam 120*c*, and fourth beam 120*d* is located along the same or substantially the same plane. At least one of first beam 120*a*, second beam 120*b*, third beam 120*c*, and fourth beam 120*d* may be warped so as to intersect with the plane. Each of first beam 120*a*, second beam 120*b*, third beam 120*c*, and fourth beam 120*d* extends from annular base 110 towards the center of annular base 110 and is adjacent to each other in the circumferential direction of base 110. In the present preferred embodiment, first beam 120*a*, second beam 120*b*, third beam 120*c*, and fourth beam 120*d* are configured to be rotationally symmetric with respect to the center of base 110.

First connection portion 130*a* connects first tip 122*a* and second tip 122*b* to each other. Second connection portion 130*b* connects second tip 122*b* and third tip 122*c* to each other. Third connection portion 130*c* connects third tip 122*c* and fourth tip 122*d* to each other. Fourth connection portion 130*d* connects fourth tip 122*d* and first tip 122*a* to each other.

As illustrated in FIG. 2, each of first beam 120*a*, second beam 120*b*, third beam 120*c*, and fourth beam 120*d* is a piezoelectric vibration portion including a plurality of layers 10. In FIG. 1, each of the plurality of layers 10 is not illustrated. Details of the configuration of the plurality of layers 10 will be described later.

First fixed end 121*a*, second fixed end 121*b*, third fixed end 121*c*, and fourth fixed end 121*d* are located in the same or substantially the same virtual plane. First fixed end 121*a*, second fixed end 121*b*, third fixed end 121*c*, and fourth fixed end 121*d* are connected to the inner peripheral surface of annular base 110 when viewed from the multilayer direction. First fixed end 121*a*, second fixed end 121*b*, third fixed end 121*c*, and fourth fixed end 121*d* are adjacent to each other on the inner peripheral surface when viewed from the multilayer direction. In the present preferred embodiment, first fixed end 121*a*, second fixed end 121*b*, third fixed end 121*c*, and fourth fixed end 121*d* are respectively connected to a plurality of sides of the rectangular or substantially rectangular annular inner peripheral surface of base 110, thus being positioned so as to correspond to the plurality of sides of the rectangular or substantially rectangular annular inner peripheral surface of base 110 in a one-to-one manner when viewed from the multilayer direction.

In the present preferred embodiment, each of first beam 120*a*, second beam 120*b*, third beam 120*c*, and fourth beam 120*d* extends along the same or substantially the same virtual plane in a state where transducer 100 is not driven.

As illustrated in FIG. 1, each of first beam 120*a*, second beam 120*b*, third beam 120*c*, and fourth beam 120*d* has a tapered outer shape when viewed from the multilayer direction. Specifically, each of first beam 120*a*, second beam 120*b*, third beam 120*c*, and fourth beam 120*d* has a trapezoidal or substantially trapezoidal outer shape when viewed from the multilayer direction.

In the present preferred embodiment, a length of each of first beam 120*a*, second beam 120*b*, third beam 120*c*, and fourth beam 120*d* in the extending direction is preferably, for example, at least about 5 times a thickness dimension of each of first beam 120*a*, second beam 120*b*, third beam 120*c*, and fourth beam 120*d* in the multilayer direction from the viewpoint of facilitating the bending vibration. In FIG. 2, the thicknesses of first beam 120*a*, second beam 120*b*, third beam 120*c*, and fourth beam 120*d* are schematically illustrated.

As illustrated in FIGS. 1 and 3, a first slit 141*a* extending towards the center of base 110 is provided between first beam 120*a* and second beam 120*b*. A second slit 141*b* extending towards the center of base 110 is provided between second beam 120*b* and third beam 120*c*. A third slit 141*c* extending towards the center of base 110 is provided between third beam 120*c* and fourth beam 120*d*. A fourth slit 141*d* extending towards the center of base 110 is provided between fourth beam 120*d* and first beam 120*a*.

First slit 141*a* is positioned along two sides extending from first fixed end 121*a* towards first tip 122*a* in the trapezoidal or substantially trapezoidal outer shape of first beam 120*a*. Second slit 141*b* is positioned along two sides extending from second fixed end 121*b* towards the second tip 122*b* in the trapezoidal or substantially trapezoidal outer shape of second beam 120*b*. Third slit 141*c* is positioned along two sides extending from the third fixed end 121*c* towards the third tip 122*c* in the trapezoidal or substantially trapezoidal outer shape of third beam 120*c*. Fourth slit 141*d* is positioned along two sides extending from fourth fixed end 121*d* towards fourth tip 122*d* in the trapezoidal or substantially trapezoidal outer shape of fourth beam 120*d*. In the present preferred embodiment, first slit 141*a*, second slit 141*b*, third slit 141*c*, and fourth slit 141*d* extend from each of the plurality of corners of the rectangular or substantially rectangular annular shape of base 110 towards the center of base 110 when viewed from the multilayer direction, thus being positioned so as to correspond to each of the corners of the rectangular or substantially rectangular annular shape of base 110 in a one-to-one correspondence.

The widths of first slit 141*a*, second slit 141*b*, third slit 141*c*, and fourth slit 141*d* when viewed from the multilayer direction are, for example, preferably less than or equal to about 10 μm and more preferably less than or equal to about 1 μm. The width of each of first slit 141*a*, second slit 141*b*, third slit 141*c*, and fourth slit 141*d* when viewed from the multilayer direction is, for example, preferably less than or equal to about 300%, and more preferably less than or equal to about 30% with respect to the thickness of each of first beam 120*a*, second beam 120*b*, third beam 120*c*, and fourth beam 120*d*.

First connection portion 130*a*, second connection portion 130*b*, third connection portion 130*c*, and fourth connection portion 130*d* are partitioned from each other by a split slit 142. Split slit 142 includes a first split slit 142*a*, a second split slit 142*b*, a third split slit 142*c*, and a fourth split slit 142*d*.

First split slit 142*a* extends along a first direction (X-axis direction) from first fixed end 121*a* towards first tip 122*a* to connect a center 122*ac* of first tip 122*a* and the center of base 110. Second split slit 142*b* extends along a second direction (Y-axis direction) from second fixed end 121*b* towards second tip 122*b* to connect a center 122*bc* of second tip 122*b* and the center of base 110. Third split slit 142*c* extends along the first direction (X-axis direction) from third fixed end 121*c* towards third tip 122*c* and connects a center 122*cc* of third tip 122*c* and the center of base 110. Fourth split slit 142*d* extends along the second direction (Y-axis direction) from fourth fixed end 121*d* towards fourth tip 122*d* to connect a center 122*dc* of fourth tip 122*d* and the center of base 110.

As illustrated in FIGS. 1 and 3, first connection portion 130*a* is surrounded by first split slit 142*a* and second split slit 142*b* that connect center 122*ac* of first tip 122*a*, the center of base 110, and center 122*bc* of second tip 122*b*, first tip 122*a*, and second tip 122*b*. First connection portion 130*a* is connected to center 122*ac* of first tip 122*a* and center 122*bc* of second tip 122*b*.

Second connection portion 130*b* is surrounded by second split slit 142*b* and third split slit 142*c* that connect center 122*bc* of second tip 122*b*, the center of base 110, and center 122*cc* of third tip 122*c*, second tip 122*b*, and third tip 122*c*. Second connection portion 130*b* is connected to center 122*bc* of second tip 122*b* and center 122*cc* of third tip 122*c*.

Third connection portion 130*c* is surrounded by third split slit 142*c* and fourth split slit 142*d* that connect center 122*cc* of third tip 122*c*, the center of base 110, and center 122*dc* of fourth tip 122*d*, third tip 122*c*, and fourth tip 122*d*. Third connection portion 130*c* is connected to center 122*cc* of third tip 122*c* and center 122*dc* of fourth tip 122*d*.

Fourth connection portion 130*d* is surrounded by fourth split slit 142*d* and first split slit 142*a* that connect center 122*dc* of fourth tip 122*d*, the center of base 110, and center 122*ac* of first tip 122*a*, fourth tip 122*d*, and first tip 122*a*. Fourth connection portion 130*d* is connected to center 122*dc* of fourth tip 122*d* and center 122*ac* of first tip 122*a*.

Figure 4:
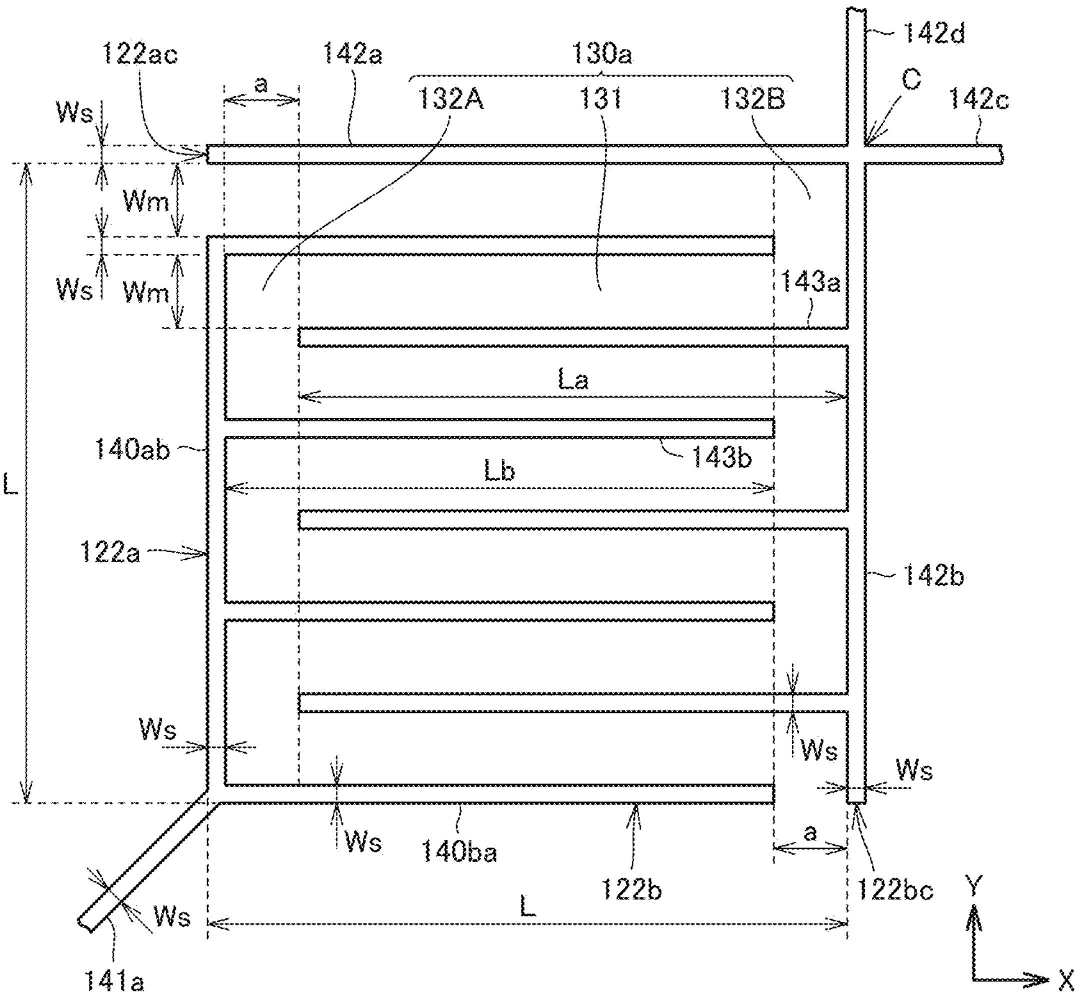
FIG. 4 is an enlarged partial plan view illustrating a first connection portion of a transducer according to a preferred embodiment of the present invention.

Each of first connection portion 130*a*, second connection portion 130*b*, third connection portion 130*c*, and fourth connection portion 130*d* has a meandering shape. FIG. 4 is an enlarged partial plan view illustrating a first connection portion of the transducer according to the present preferred embodiment of the present invention. As illustrated in FIGS. 3 and 4, first connection portion 130*a*, second connection portion 130*b*, third connection portion 130*c*, and fourth connection portion 130*d* are arranged side by side around center C of base 110.

As illustrated in FIG. 4, first connection portion 130*a* includes a plurality of longitudinal portions 131 and at least one short portion. In the present preferred embodiment, the at least one short portion includes a plurality of short portions. Specifically, first connection portion 130*a* includes a first short portion 132A and a second short portion 132B as the plurality of short portions.

Each of the plurality of longitudinal portions 131 extends along the first direction (X-axis direction) from first fixed end 121*a* towards first tip 122*a*. The lengths of the plurality of longitudinal portions 131 are the same or substantially the same.

The at least one short portion extends along the second direction (Y-axis direction) from second fixed end 121*b* towards second tip 122*b*, and connects one ends in the first direction (X-axis direction) of the plurality of longitudinal portions 131 adjacent to each other in the plurality of longitudinal portions 131. The width of the at least one short portion in the first direction (X-axis direction) is wider than the width in the second direction (Y-axis direction) of each of the plurality of longitudinal portions 131. However, the width in the first direction (X-axis direction) of the at least one short portion may be less than or equal to the width in the second direction (Y-axis direction) of each of the plurality of longitudinal portions 131.

Longitudinal portions 131 arranged in the second direction (Y-axis direction) in the plurality of longitudinal portions 131 are alternately connected at the first end and the second end in the first direction (X-axis direction) by the corresponding short portion of the plurality of short portions. Specifically, the plurality of longitudinal portions 131 are arranged in parallel or substantially in parallel to longitudinal portion 131 connected to the center of first tip 122*a* towards second tip 122*b*, and the second ends on the side of second split slit 142*b* are connected to each other by second short portion 132B in longitudinal portion 131 connected to the center of first tip 122*a* and longitudinal portion 131 adjacent to longitudinal portion 131. In longitudinal portion 131 that is adjacent to longitudinal portion 131 connected to the center of first tip 122*a* and connected to the second end, and longitudinal portion 131 adjacent to second tip 122*b* of longitudinal portion 131, the first ends on the side of first tip 122*a* are connected to each other by first short portion 132A. Thus, first short portion 132A and second short portion 132B alternately connect the first end and the second end of the plurality of longitudinal portions 131 towards second tip 122*b*. Among the plurality of longitudinal portions 131, the second end of longitudinal portion 131 opposite to second tip 122*b* is connected to the center of second tip 122*b*.

A plurality of first intermediate slits 143*a* and at least one second intermediate slit 143*b* are provided in first connection portion 130*a*. Each of the plurality of first intermediate slits 143*a* extends from second split slit 142*b* towards tip 122*a* of first beam 120*a*. At least one second intermediate slit 143*b* is disposed between first intermediate slits 143*a* adjacent to each other in the plurality of first intermediate slits 143*a*, and extends from the side of tip 122*a* of first beam 120*a* towards second split slit 142*b*. Specifically, the plurality of first intermediate slits 143*a* and the plurality of second intermediate slits 143*b* are provided so as to partition the plurality of longitudinal portions 131 from each other. The plurality of first intermediate slits 143*a* extend from second split slit 142*b* to the central portion in the second direction (Y-axis direction) of first short portion 132A.

In the present preferred embodiment, the plurality of second intermediate slits 143*b* are provided in first connection portion 130*a*. However, at least one second intermediate slit 143*b* may be provided in first connection portion 130*a*. Each of the plurality of second intermediate slits 143*b* is connected to a first connection slit 140*ab* extending from the tip of first slit 141*a* towards one side in the Y-axis direction. Specifically, the plurality of second intermediate slits 143*b* extend from first connection slit 140*ab* to the central portion in the second direction (Y-axis direction) of second short portion 132B.

The plurality of first intermediate slits 143*a* and the plurality of second intermediate slits 143*b* are alternately arranged one by one in the second direction (Y-axis direction). Each of the plurality of first intermediate slits 143*a* and the at least one second intermediate slit 143*b* is located in parallel or substantially in parallel with first split slit 142*a*. A length La of each of the plurality of first intermediate slits 143*a* and a length Lb of at least one second intermediate slit 143*b* are the same or substantially the same.

A first defining slit 140*ba* extending in the X-axis direction between the tip of first slit 141*a* and second split slit 142*b* is provided in first connection portion 130*a*. In the present preferred embodiment, first defining slit 140*ba* is connected to the tip of first slit 141*a*.

A boundary of first connection portion 130*a* is defined by first split slit 142*a*, second split slit 142*b*, first connection slit 140*ab*, and first defining slit 140*ba*. Specifically, first connection slit 140*ab* is located at the boundary between first beam 120*a* and first connection portion 130*a*. First defining slit 140*ba* is located at a boundary between second beam 120*b* and first connection portion 130*a*.

As illustrated in FIG. 4, the width of each slit is Ws. The width in the second direction (Y-axis direction) of longitudinal portion 131 is Wm. The width in the first direction (X-axis direction) of each of first short portion 132A and second short portion 132B is a. The length of each in the first direction (X-axis direction) and the second direction (Y-axis direction) of first connection portion 130*a* is L. For example, Wm=about 10 μm, Ws=about 1 μm, and a=about 15 μm. Ws≤about 1 μm is preferably satisfied, for example.

Width Wm in the second direction (Y-axis direction) of each of the plurality of longitudinal portions 131 is wider than the width Ws in the second direction (Y-axis direction) of the intermediate slit between adjacent longitudinal portions 131 of the plurality of longitudinal portions 131. That is, the dimension of shortest distance Wm between first intermediate slit 143*a* and second intermediate slit 143*b* adjacent to each other is larger than the dimension of width Ws in the second direction (Y-axis direction) of each of the plurality of first intermediate slits 143*a* and the dimension in the (Y-axis direction) of width Ws of at least one second intermediate slit 143*b*.

The dimension of a shortest distance a between at least one second intermediate slit 143*b* and second split slit 142*b* is larger than the dimension of shortest distance Wm between first intermediate slit 143*a* and second intermediate slit 143*b* adjacent to each other. However, the dimension of shortest distance a between at least one second intermediate slit 143*b* and second split slit 142*b* may be less than or equal to the dimension of shortest distance Wm between first intermediate slit 143*a* and second intermediate slit 143*b* adjacent to each other.

When the number of turns of the meandering shape of first connection portion 130*a* is n, for example, a relationship of L=(Wm+Ws)×n or L=(Wm+Ws)×(n+1) is satisfied. The number n of turns of the meandering shape of first connection portion 130*a* in FIG. 4 is 6, and a relationship of L=(Wm+Ws)×7 is satisfied, for example. However, the relationship of L=(Wm+Ws)×n or L=(Wm+Ws)×(n+1) may not be necessarily satisfied.

In the region surrounded by first split slit 142*a*, second split slit 142*b*, first tip 122*a*, and second tip 122*b*, first connection portion 130*a* has an area greater than or equal to about 70% and less than about 100%, for example. First connection portion 130*a* may be, for example, less than about 70% in the region surrounded by first split slit 142*a*, second split slit 142*b*, first tip 122*a*, and second tip 122*b*.

Each of second connection portion 130*b*, third connection portion 130*c*, and fourth connection portion 130*d* has the same or substantially the same configuration as that of first connection portion 130*a*.

In second connection portion 130*b*, each of the plurality of first intermediate slits 143*a* extends from second split slit 142*b* towards tip 122*c* of third beam 120*c*. Each of the plurality of second intermediate slits 143*b* is connected to a second connection slit 140*cb* extending from the tip of second slit 141*b* towards one side in the Y-axis direction.

A second defining slit 140*bc* extending in the X-axis direction between the tip of second slit 141*b* and second split slit 142*b* is provided in second connection portion 130*b*. In the present preferred embodiment, second defining slit 140*bc* is connected to the tip of second slit 141*b*.

The boundary of second connection portion 130*b* is defined by second split slit 142*b*, third split slit 142*c*, second connection slit 140*cb*, and second defining slit 140*bc*. Specifically, second defining slit 140*bc* is located at the boundary between second beam 120*b* and second connection portion 130*b*. Second connection slit 140*cb* is located at the boundary between third beam 120*c* and second connection portion 130*b*.

In the region surrounded by second split slit 142*b*, third split slit 142*c*, second tip 122*b*, and third tip 122*c*, second connection portion 130*b* has, for example, an area greater than or equal to about 90% and less than about 100%.

In third connection portion 130*c*, each of the plurality of first intermediate slits 143*a* extends from fourth split slit 142*d* towards third tip 122*c* of third beam 120*c*. Each of the plurality of second intermediate slits 143*b* is connected to third connection slit 140*cd* extending from the tip of third slit 141*c* towards the other side in the Y-axis direction.

Third defining slit 140*dc* extending in the X-axis direction between the tip of third slit 141*c* and fourth split slit 142*d* is provided in third connection portion 130*c*. In the preferred embodiment, third defining slit 140*dc* is connected to the tip of third slit 141*c*.

The boundary of third connection portion 130*c* is defined by third split slit 142*c*, fourth split slit 142*d*, third connection slit 140*cd*, and third defining slit 140*dc*. Specifically, third connection slit 140*cd* is located at the boundary between third beam 120*c* and third connection portion 130*c*. Third defining slit 140*dc* is located at the boundary between fourth beam 120*d* and third connection portion 130*c*.

In the region surrounded by third split slit 142*c*, fourth split slit 142*d*, third tip 122*c*, and fourth tip 122*d*, third connection portion 130*c* has, for example, an area greater than or equal to about 90% and less than about 100%.

In fourth connection portion 130*d*, each of the plurality of first intermediate slits 143*a* extends from fourth split slit 142*d* towards tip 122*a* of first beam 120*a*. Each of the plurality of second intermediate slits 143*b* is connected to a fourth connection slit 140*ad* extending from the tip of fourth slit 141*d* towards the other side in the Y-axis direction.

Fourth defining slit 140*da* extending in the X-axis direction between the tip of fourth slit 141*d* and fourth split slit 142*d* is provided in fourth connection portion 130*d*. In the present preferred embodiment, fourth defining slit 140*da* is connected to the tip of fourth slit 141*d*.

The boundary of fourth connection portion 130*d* is defined by third split slit 142*c*, fourth split slit 142*d*, fourth connection slit 140*ad*, and fourth defining slit 140*da*. Specifically, fourth defining slit 140*da* is located at the boundary between fourth beam 120*d* and fourth connection portion 130*d*. Fourth connection slit 140*ad* is located at the boundary between first beam 120*a* and fourth connection portion 130*d*.

In the region surrounded by fourth split slit 142*d*, first split slit 142*a*, fourth tip 122*d*, and the first tip 122*a*, fourth connection portion 130*d* has, for example, an area greater than or equal to about 90% and less than about 100%.

Here, a transducer according to a first modification of a present preferred embodiment of the present invention having a different slit shape will be described.

Figure 5:
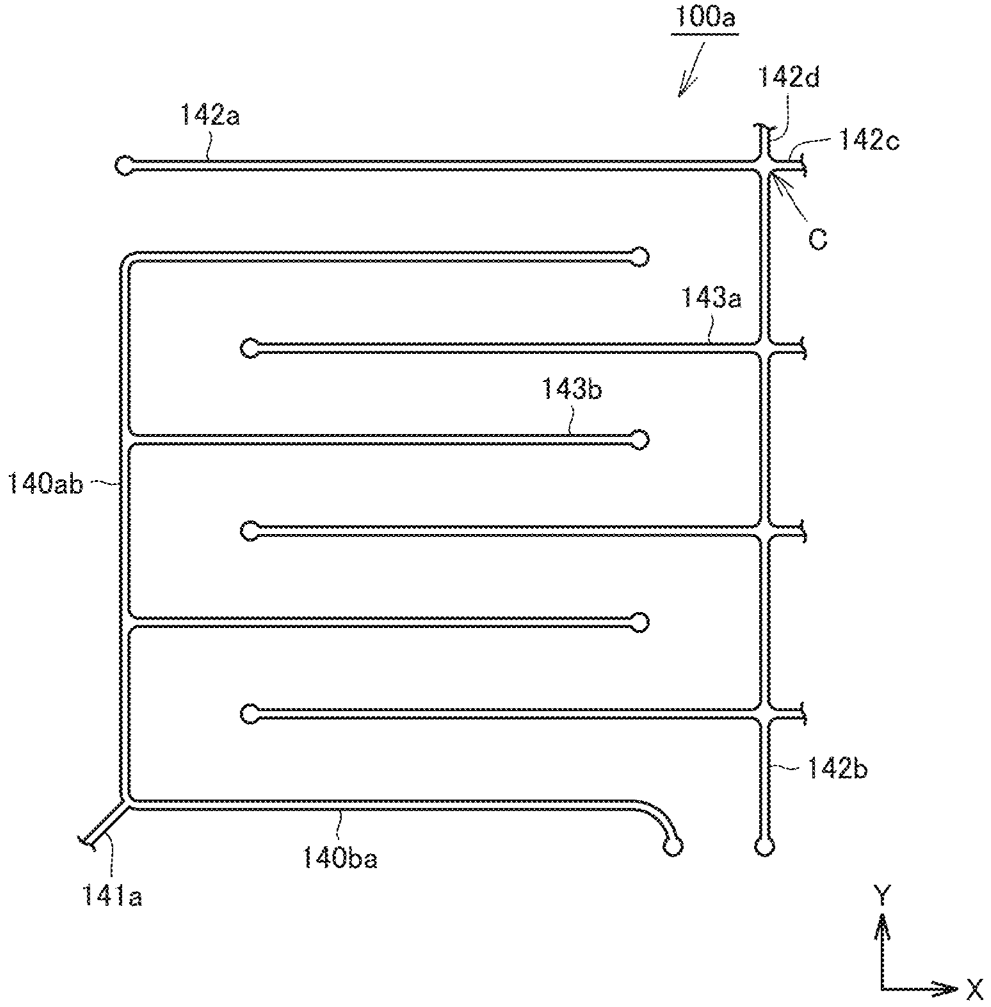
FIG. 5 is a partial plan view illustrating a transducer according to a first modification of a preferred embodiment of the present invention.

FIG. 5 is a partial plan view illustrating the transducer according to the first modification. FIG. 5 illustrates a portion the same as or similar to transducer 100 of the preferred embodiment of the present invention shown in FIG. 4.

As illustrated in FIG. 5, in a transducer 100*a* according to the first modification, a connection spot of each slit is curved. The end of each slit is rounded. Thus, internal stress in first connection portion 130*a* can be reduced.

The plurality of layers 10 will be described below. As illustrated in FIG. 2, in the present preferred embodiment, the plurality of layers 10 includes a piezoelectric layer 11, a first electrode layer 12, and a second electrode layer 13.

Piezoelectric layer 11 is made of, for example, a single crystal piezoelectric body. A cutting orientation of piezoelectric layer 11 is appropriately selected so as to exhibit desired device characteristics. In the present preferred embodiment, piezoelectric layer 11 is obtained by thinning a single crystal substrate, and the single crystal substrate is specifically a rotating Y-cut substrate. The cutting orientation of the rotating Y-cut substrate is specifically 30°, for example. For example, the thickness of piezoelectric layer 11 is greater than or equal to about 0.3 μm and less than or equal to about 5.0 μm. The single-crystal piezoelectric body has a polarization axis. Details of the axial direction of the polarization axis will be described later.

A material of piezoelectric layer 11 is appropriately selected such that transducer 100 exhibits the desired device characteristics. In the present preferred embodiment, piezoelectric layer 11 is made of, for example, an inorganic material. Specifically, piezoelectric layer 11 is made of, for example, an alkali niobate compound or an alkali tantalate compound. In the present preferred embodiment, the alkali metal included in the alkali niobate compound or the alkali tantalate compound includes, for example, at least one of lithium, sodium, and potassium. In the present preferred embodiment, piezoelectric layer 11 is made of, for example, lithium niobate ($LiNbO_3$) or lithium tantalate ($LiTaO_3$).

As illustrated in FIG. 2, first electrode layer 12 is disposed on one side of piezoelectric layer 11 in the multilayer direction of the plurality of layers 10. Second electrode layer 13 is disposed on the other side of piezoelectric layer 11 so as to be opposed to at least a portion of first electrode layer 12 with piezoelectric layer 11 interposed therebetween.

In the present preferred embodiment, adhesion layers (not illustrated) are disposed between first electrode layer 12 and piezoelectric layer 11, between second electrode layer 13 and piezoelectric layer 11, and between second electrode layer 13 and piezoelectric layer 11.

In the present preferred embodiment, each of first electrode layer 12 and second electrode layer 13 is made of, for example, Pt. Each of first electrode layer 12 and second electrode layer 13 may be made of another material such as, for example, Al. The adhesion layer is made of, for example, Ti. The adhesion layer may be made of another material such as, for example, a NiCr alloy. Each of first electrode layer 12, second electrode layer 13, and the adhesion layer may be an epitaxial growth film. When piezoelectric layer 11 is made of, for example, lithium niobate ($LiNbO_3$), the adhesion layer is preferably made of, for example, NiCr from the viewpoint of preventing diffusion of the material constituting the adhesion layer into first electrode layer 12 or second electrode layer 13. This improves reliability of transducer 100.

In the present preferred embodiment, for example, the thickness of each of first electrode layer 12 and second electrode layer 13 is greater than or equal to about 0.05 μm and less than or equal to about 0.2 μm. For example, the thickness of the adhesion layer is greater than or equal to about 0.005 μm and less than or equal to about 0.05 μm.

The plurality of layers 10 further include a support layer 14. Support layer 14 is disposed on the side opposite to first electrode layer 12 of piezoelectric layer 11 and on the side opposite to piezoelectric layer 11 of second electrode layer 13. Support layer 14 includes a first support 14*a* and a second support 14*b* laminated on the side opposite to piezoelectric layer 11 of first support 14*a*. In the present preferred embodiment, first support 14*a* is made of, for example, $SiO_2$, and second support 14*b* is made of, for example, single crystal Si. In the present preferred embodiment, the thickness of support layer 14 is preferably thicker than that of piezoelectric layer 11 from the viewpoint of the bending vibration of first to fourth beams 120*a* to 120*d*. The mechanism of the bending vibration of first to fourth beams 120*a* to 120*d* will be described later.

As illustrated in FIG. 2, in the present preferred embodiment, first to fourth connection portions 130*a* to 130*d* are configured by continuing the plurality of layers 10 respectively defining first to fourth beams 120*a* to 120*d* in the direction orthogonal or substantially orthogonal to the multilayer direction. However, in the present preferred embodiment, the plurality of layers 10 in first to fourth connection portions 130*a* to 130*d* do not include first electrode layer 12 and second electrode layer 13. When second support 14*b* is made of low-resistance Si, second support 14*b* can define and function as the lower electrode layer without providing second electrode layer 13. In this case, the plurality of layers 10 in first to fourth connection portions 130*a* to 130*d* include the lower electrode layer.

Furthermore, members defining base 110 will be described. As illustrated in FIG. 2, in the present preferred embodiment, base 110 includes the plurality of layers 10 similar to first to fourth beams 120*a* to 120*d*. The plurality of layers 10 of base 110 are structured by continuing the plurality of layers 10 of first to fourth beams 120*a* to 120*d*. Specifically, piezoelectric layer 11, first electrode layer 12, second electrode layer 13, and support layer 14 of base 110 are continuous to piezoelectric layer 11, first electrode layer 12, second electrode layer 13, and support layer 14 of first to fourth beams 120*a* to 120*d*, respectively. Base 110 further includes a substrate layer 15, a first connection electrode layer 20, and a second connection electrode layer 30.

Substrate layer 15 is connected to support layer 14 on the side opposite to piezoelectric layer 11 in the axial direction of the central axis of annular base 110. Substrate layer 15 includes a first substrate layer 15*a* and a second substrate layer 15*b* laminated on the side opposite to support layer 14 of first substrate layer 15*a* in the axial direction of the central axis. In the present preferred embodiment, first substrate layer 15*a* is made of, for example, $SiO_2$, and second substrate layer 15*b* is made of, for example, single crystal Si.

As illustrated in FIG. 2, first connection electrode layer 20 is exposed to the outside while being electrically connected to first electrode layer 12 with an adhesion layer (not illustrated) interposed therebetween. Specifically, first connection electrode layer 20 is disposed on the side opposite to support layer 14 of second electrode layer 13 in base 110.

For example, the thickness of each of first connection electrode layer 20 and second connection electrode layer 30 is greater than or equal to about 0.1 μm and less than or equal to about 1.0 μm. For example, the thickness of each of the adhesion layer connected to first connection electrode layer 20 and the adhesion layer connected to second connection electrode layer 30 is greater than or equal to about 0.005 μm and less than or equal to about 0.1 μm.

In the present preferred embodiment, each of first connection electrode layer 20 and second connection electrode layer 30 is made of, for example, Au. First connection electrode layer 20 and second connection electrode layer 30 may be made of another conductive material such as, for example, Al. For example, each of the adhesion layer connected to first connection electrode layer 20 and the adhesion layer connected to second connection electrode layer 30 is made of Ti. These adhesion layers may be made of, for example, NiCr.

As illustrated in FIG. 2, an opening 101 that opens to the side opposite to piezoelectric layer 11 in the multilayer direction is provided in transducer 100 of the present preferred embodiment.

Here, the axial direction of the polarization axis of the single-crystal piezoelectric body defining piezoelectric layer 11 will be described. Preferably, the axial direction of the virtual axis when the polarization axis of the single-crystal piezoelectric body is projected from the multilayer direction onto the virtual plane orthogonal or substantially orthogonal to the multilayer direction extends in the same or substantially the same direction in any of first to fourth beams 120*a* to 120*d*, and preferably the angle formed with the extending direction of each of first to fourth slits 141*a* to 141*d* is not about 45 degrees or about 135 degrees when viewed from the multilayer direction.

More specifically, in the present preferred embodiment, the axial direction of the virtual axis preferably has, for example, an angle formed by the extending direction of each of first to fourth slits 141*a* to 141*d* of greater than or equal to about 0 degrees and less than or equal to about 5 degrees, greater than or equal to about 85 degrees and less than or equal to about 95 degrees, or greater than or equal to about 175 degrees and less than or equal to about 180 degrees when viewed from the multilayer direction.

In addition, the angle formed by the extending direction of each of the first to fourth beams 120*a* to 120*d* when viewed from the multilayer direction and the axial direction of the virtual axis when viewed from the multilayer direction is more preferably, for example, greater than or equal to about 40 degrees and less than or equal to about 50 degrees, or greater than or equal to about 130 degrees and less than or equal to about 140 degrees. The reason why a suitable range exists for each angle with respect to the virtual axis will be described later.

In the present preferred embodiment, the axial direction of the virtual axis is oriented in a specific direction, but the axial direction of the virtual axis is not particularly limited.

In the present preferred embodiment, because the single-crystal piezoelectric body has a polarization axis, thermal stress is generated in first to fourth beams 120*a* to 120*d*, so that each of first to fourth beams 120*a* to 120*d* is sometimes warped when viewed from the direction orthogonal or substantially orthogonal to the multilayer direction. A modification in which each of first to fourth beams 120*a* to 120*d* is warped will be described below. In the following description, second beam 120*b* and third beam 120*c* are illustrated by way of example.

Figure 6:
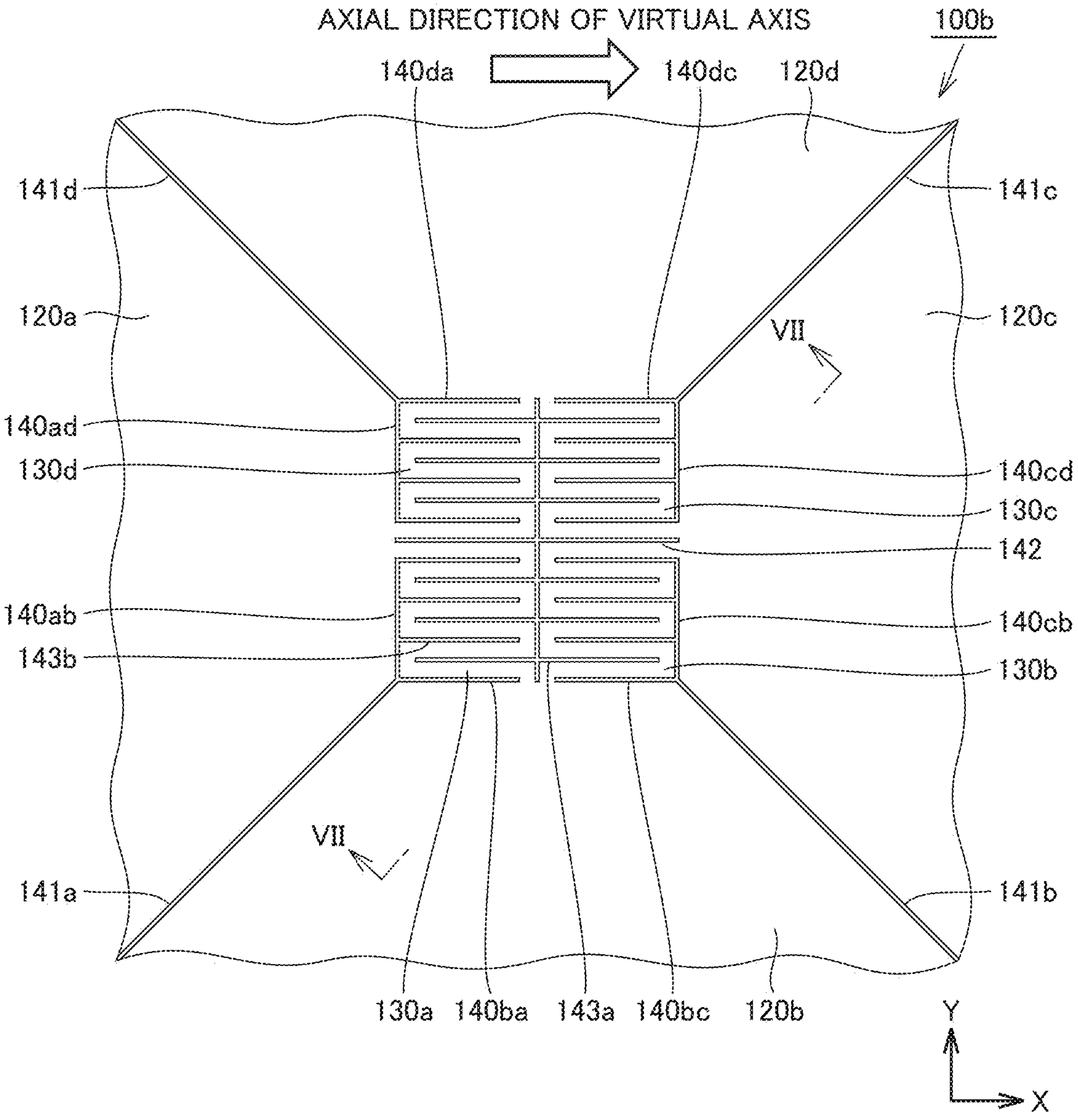
FIG. 6 is a plan view illustrating a transducer according to a second modification of a preferred embodiment of the present invention.
Figure 7:
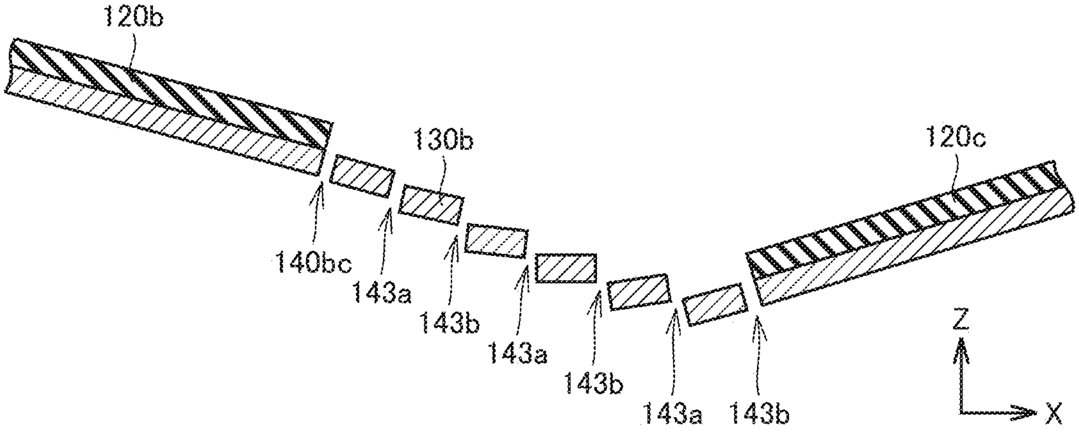
FIG. 7 is a partial sectional view illustrating the transducer in FIG. 6 as viewed from the arrow direction of a line VII-VII.

FIG. 6 is a plan view illustrating a transducer according to a second modification of a preferred embodiment of the present invention. FIG. 7 is a partial sectional view illustrating the transducer in FIG. 6 as viewed from the arrow direction of a line VII-VII.

As illustrated in FIG. 6, in a transducer 100*b* of the second modification, the angle between the axial direction of the virtual axis and each of first to fourth slits 141*a* to 141*d* is, for example, approximately 45 degrees when viewed from the multilayer direction.

In the present modification, when the thermal stress is applied to first to fourth beams 120*a* to 120*d*, adjacent beams warp in different manners in a vicinity of first to fourth connection portions 130*a* to 130*d*.

In transducer 100*b* according to the second modification, the above-described thermal stress is applied to first to fourth beams 120*a* to 120*d*. As a result, as illustrated in FIG. 7, in the state where transducer 100*b* is not driven, the ends of the adjacent beams in the vicinity of the centers of first to fourth connection portions 130*a* to 130*d* are located at different positions in the multilayer direction.

Figure 8:
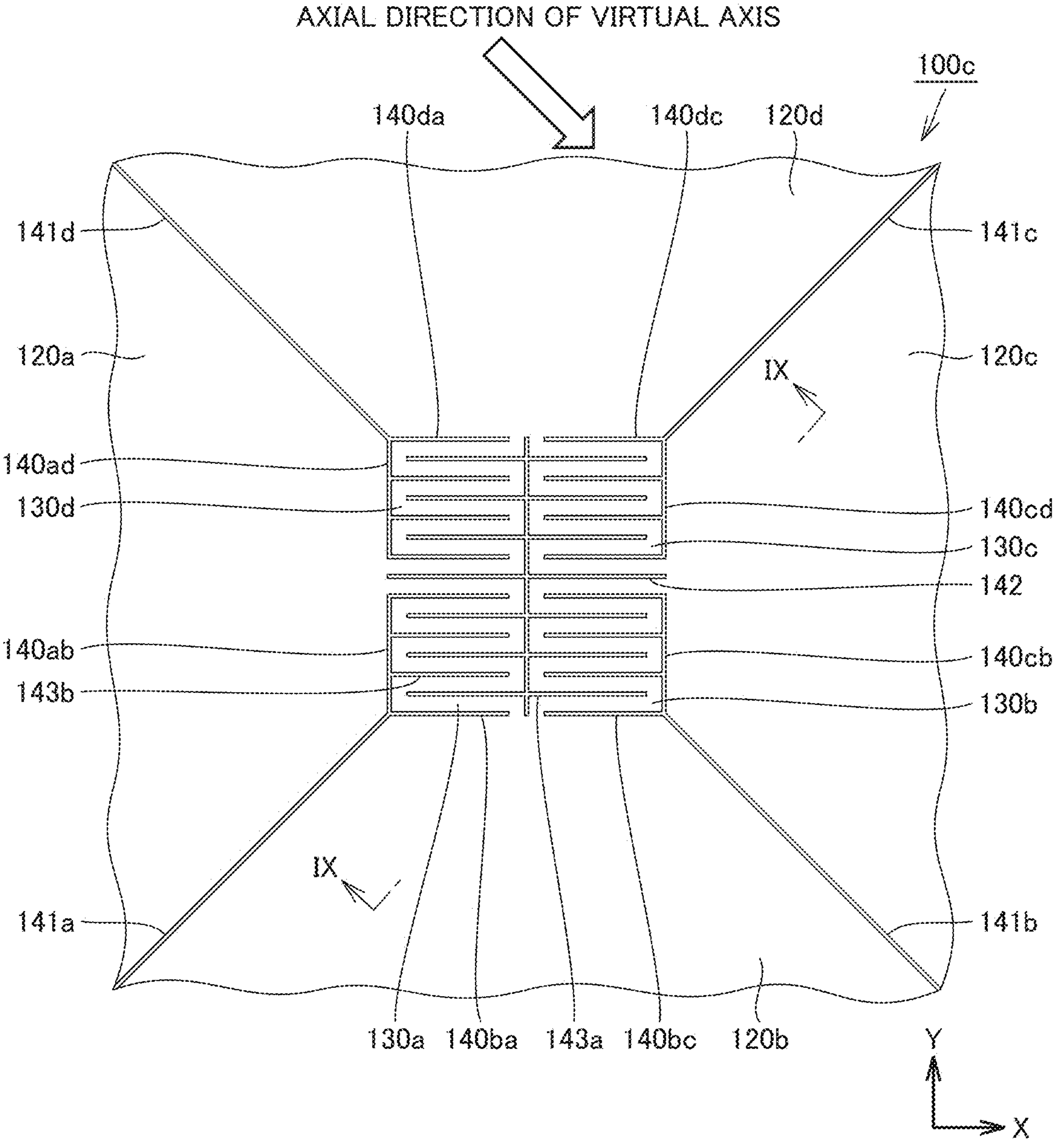
FIG. 8 is a plan view illustrating a transducer according to a third modification of a preferred embodiment of the present invention.
Figure 9:
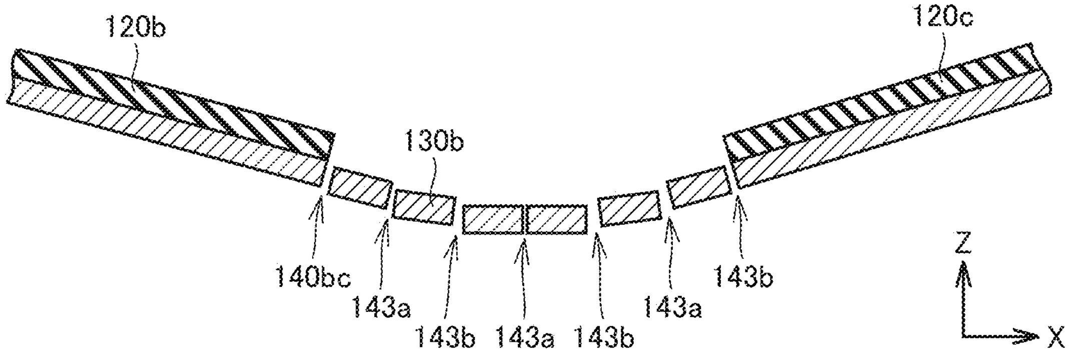
FIG. 9 is a partial sectional view illustrating the transducer in FIG. 8 as viewed from the arrow direction of a line IX-IX.

FIG. 8 is a plan view illustrating a transducer according to a third modification of a preferred embodiment of the present invention. FIG. 9 is a partial sectional view illustrating the transducer in FIG. 8 as viewed from the arrow direction of a line IX-IX.

As illustrated in FIG. 8, in a transducer 100*c* according to the third modification, the angle between the axial direction of the virtual axis of the single-crystal piezoelectric body and each of first to fourth slits 141*a* to 141*d* is approximately 0 degrees or approximately 90 degrees when viewed from the multilayer direction.

In transducer 100*c* of the third modification, each of first to fourth beams 120*a* to 120*d* is warped by applying the thermal stress to first to fourth beams 120*a* to 120*d*. As a result, as illustrated in FIG. 9, in the state where transducer 100*c* is not driven, ends on the center side of first to fourth connection portions 130*a* to 130*d* of the beams adjacent to each other in the vicinity of the center of first to fourth connection portions 130*a* to 130*d* are located at the same or substantially the same position in the multilayer direction. As described above, in the third modification, even when each of first to fourth beams 120*a* to 120*d* is warped by the thermal stress, breakage of first to fourth connection portions 130*a* to 130*d*, particularly, first short portion 132A and second short portion 132B can be prevented.

As described above, by comparing transducer 100*b* according to the second modification and transducer 100*c* according to the third modification, it can be seen that the difference in displacement due to thermal stress between adjacent beams can be prevented from increasing as the angle between the axial direction of the virtual axis and the extending direction of each of first to fourth slits 141*a* to 141*d* approaches 0 degrees or 90 degrees from the state where the angle is about 45 degrees or about 135 degrees when viewed from the multilayer direction.

As illustrated in FIG. 9, in transducer 100*c* according to the third modification, when each of the beams adjacent to each other is viewed from the sides of first to fourth slits 141*a* to 141*d*, each of the beams adjacent to each other is inclined in any one direction of the multilayer direction.

In transducer 100 of the present preferred embodiment, each of first to fourth beams 120*a* to 120*d* is configured to be capable of performing the bending vibration. Here, the mechanism of the bending vibration of first to fourth beams 120*a* to 120*d* will be described.

Figure 10:
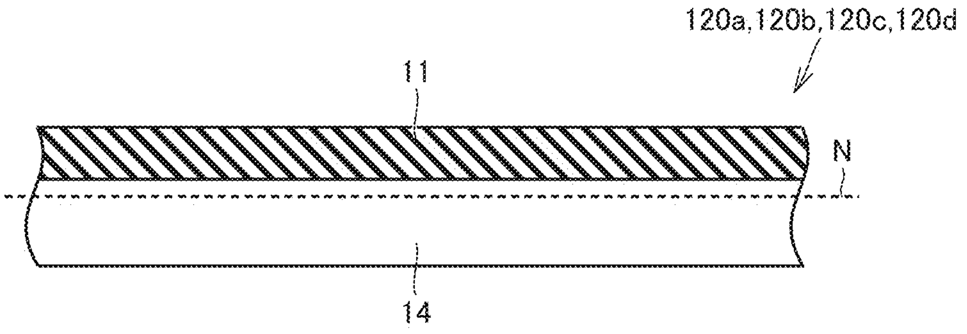
FIG. 10 is a sectional view schematically illustrating a portion of a beam of a transducer according to a preferred embodiment of the present invention.
Figure 11:
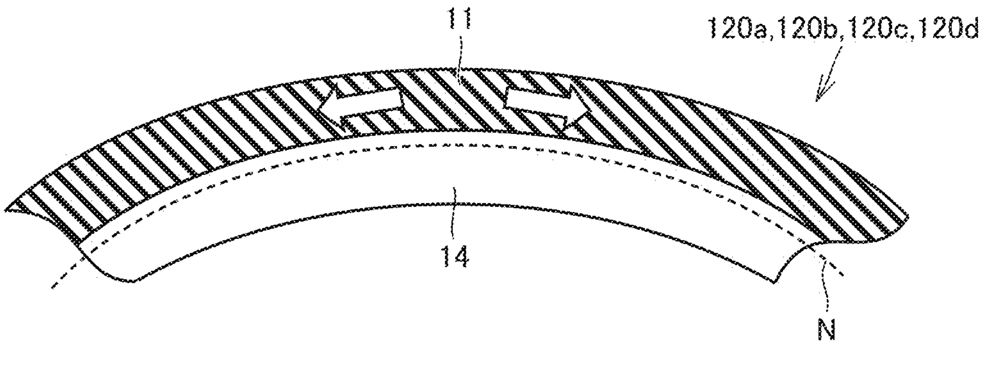
FIG. 11 is a sectional view schematically illustrating a portion of a beam during driving of a transducer according to a preferred embodiment of the present invention.

FIG. 10 is a sectional view schematically illustrating a portion of the beam of the transducer according to the present preferred embodiment. FIG. 11 is a sectional view schematically illustrating a portion of the beam during driving of the transducer according to the present preferred embodiment. In FIGS. 10 and 11, the first electrode layer and the second electrode layer are not illustrated.

As illustrated in FIGS. 10 and 11, in the present preferred embodiment, in first to fourth beams 120*a* to 120*d*, piezoelectric layer 11 defines and functions as a stretchable layer stretchable in an in-plane direction orthogonal or substantially orthogonal to the multilayer direction, and layers other than piezoelectric layer 11 define and function as a constraining layer. In the present preferred embodiment, support layer 14 mainly defines and functions as the constraining layer. As described above, the constraining layer is laminated on the stretchable layer in the direction orthogonal or substantially orthogonal to the extending direction of the stretchable layer. Instead of the constraining layer, first to fourth beams 120*a* to 120*d* may include a reverse-direction stretchable layer that can contract in the in-plane direction when the stretchable layer extends in the in-plane direction and extend in the in-plane direction when the stretchable layer contracts in the in-plane direction.

When piezoelectric layer 11 that is the stretchable layer attempts to expand and contract in the in-plane direction, support layer 14 that is a main portion of the constraining layer constrains the expansion and contraction of piezoelectric layer 11 at a joining surface with piezoelectric layer 11. Furthermore, in the present preferred embodiment, in each of first to fourth beams 120*a* to 120*d*, piezoelectric layer 11 that is the stretchable layer is located only on one side of a stress neutral plane N of each of first to fourth beams 120*a* to 120*d*. The position of the center of gravity of support layer 14 mainly defining the constraining layer is located on the other side of stress neutral plane N. Thus, as illustrated in FIGS. 10 and 11, when piezoelectric layer 11 that is the stretchable layer expands and contracts in the in-plane direction, each of first to fourth beams 120*a* to 120*d* is bent in the direction orthogonal or substantially orthogonal to the in-plane direction. A displacement amount of each of first to fourth beams 120*a* to 120*d* when each of first to fourth beams 120*a* to 120*d* is bent increases as the separation distance between stress neutral plane N and piezoelectric layer 11 increases. In addition, the displacement amount increases as the stress with which piezoelectric layer 11 tries to expand and contract increases. In this manner, each of first to fourth beams 120*a* to 120*d* performs the bending vibration with first to fourth fixed ends 121*a* to 121*d* as starting points in the direction orthogonal or substantially orthogonal to the in-plane direction.

Furthermore, in transducer 100 of the present preferred embodiment, since first to fourth connection portions 130*a* to 130*d* are provided, the vibration in a fundamental vibration mode is likely to be generated, and the generation of the vibration in a coupled vibration mode is reduced or prevented. The fundamental vibration mode is a mode in which the phases when first to fourth beams 120*a* to 120*d* perform the bending vibration are aligned, and entire or substantially the entire first to fourth beams 120*a* to 120*d* are displaced upward or downward. On the other hand, the coupled vibration mode is a mode in which a phase of at least one of first to fourth beams 120*a* to 120*d* is not aligned with a phase of another beam 120 when each of first to fourth beams 120*a* to 120*d* performs the bending vibration.

Figure 12:
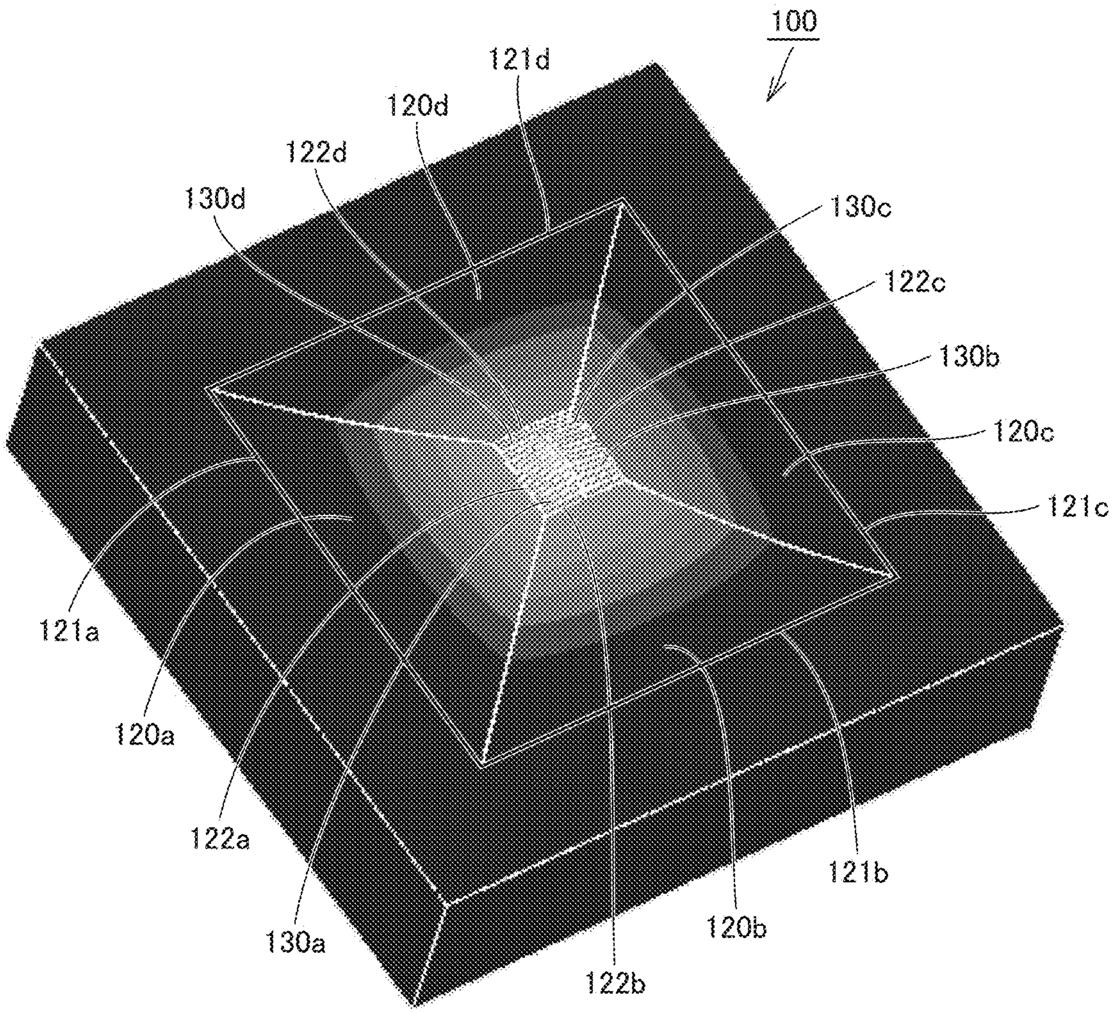
FIG. 12 is a perspective view illustrating a transducer according to a preferred embodiment of the present invention vibrating in a fundamental vibration mode by simulation.

FIG. 12 is a perspective view illustrating the transducer of the present preferred embodiment vibrating in the fundamental vibration mode by simulation. Specifically, FIG. 12 illustrates transducer 100 in the state in which each of first to fourth beams 120*a* to 120*d* is displaced towards first electrode layer 12. In FIG. 12, the color becomes lighter as the displacement amount by which each of first to fourth beams 120*a* to 120*d* is displaced towards the side of first electrode layer 12 becomes larger. In FIG. 12, each layer of the plurality of layers 10 is not illustrated.

As illustrated in FIG. 12, for each of first to fourth beams 120*a* to 120*d*, the beams adjacent to each other are connected to each other by first to fourth connection portions 130*a* to 130*d*, so that the generation of the coupled vibration mode is prevented. In this manner, because first to fourth beams 120*a* to 120*d* are connected to each other at the tips, the coupled vibration mode can be less likely to be generated.

Furthermore, because each of first to fourth connection portions 130*a* to 130*d* of transducer 100 of the present preferred embodiment has a meandering shape, first to fourth connection portions 130*a* to 130*d* define and function as leaf springs when first to fourth beams 120*a* to 120*d* vibrate, and first to fourth connection portions 130*a* to 130*d* connect the beams adjacent to each other, and the lengths of first to fourth connection portions 130*a* to 130*d* as the leaf springs are increased, so that connection force can be prevented from becoming too strong.

In transducer 100 of the present preferred embodiment, the vibration in the fundamental vibration mode is likely to be generated, and the generation of the coupled vibration mode is reduced or prevented, so that the device characteristic is improved particularly when the transducer is used as an ultrasonic transducer. A functional action of transducer 100 of the present preferred embodiment when the transducer 100 is used as the ultrasonic transducer will be described below.

First, when the ultrasonic wave is generated by transducer 100, voltage is applied between first connection electrode layer 20 and second connection electrode layer 30 in FIG. 2. Then, the voltage is applied between first electrode layer 12 connected to first connection electrode layer 20 and second electrode layer 13 connected to second connection electrode layer 30. Further, also in each of first to fourth beams 120*a* to 120*d*, the voltage is applied between first electrode layer 12 and second electrode layer 13 that are opposite to each other with piezoelectric layer 11 interposed therebetween. Then, because piezoelectric layer 11 expands and contracts along the in-plane direction orthogonal or substantially orthogonal to the multilayer direction, each of first to fourth beams 120*a* to 120*d* performs the bending vibration along the multilayer direction by the above-described mechanism. Thus, the force is applied to the medium around first to fourth beams 120*a* to 120*d* of transducer 100, and the medium further vibrates to generate the ultrasonic wave.

Further, in transducer 100 of the present preferred embodiment, each of first to fourth beams 120*a* to 120*d* has a unique mechanical resonance frequency. Therefore, when the applied voltage is a sinusoidal voltage and the frequency of the sinusoidal voltage is close to the value of the resonance frequency, the displacement amount when each of first to fourth beams 120*a* to 120*d* is bent increases.

When the ultrasonic wave is detected by transducer 100, the medium around each of first to fourth beams 120*a* to 120*d* vibrates by the ultrasonic wave, the force is applied to each of first to fourth beams 120*a* to 120*d* from the surrounding medium, and each of first to fourth beams 120*a* to 120*d* performs the bending vibration. When each of first to fourth beams 120*a* to 120*d* performs the bending vibration, the stress is applied to piezoelectric layer 11. When the stress is applied to piezoelectric layer 11, an electric charge is induced in piezoelectric layer 11. The electric charge induced in piezoelectric layer 11 generates a potential difference between first electrode layer 12 and second electrode layer 13 that are opposite to each other with piezoelectric layer 11 interposed therebetween. This potential difference is detected by first connection electrode layer 20 connected to first electrode layer 12 and second connection electrode layer 30 connected to second electrode layer 13. This enables transducer 100 to detect the ultrasonic wave.

In addition, when the ultrasonic wave that is the detection target includes many specific frequency components and when these frequency components are close to the value of the resonance frequency, the displacement amount when each of first to fourth beams 120*a* to 120*d* performs the bending vibration increases. The potential difference increases as the displacement amount increases.

As described above, when transducer 100 of the present preferred embodiment is used as an ultrasonic transducer, the design of the resonance frequencies of first to fourth beams 120*a* to 120*d* is significant. The resonance frequency varies depending on the length in the extending direction of each of first to fourth beams 120*a* to 120*d*, the thickness in the axial direction of the central axis, the length of first to fourth fixed ends 121*a* to 121*d* when viewed from the axial direction, and the density and elastic modulus of the material of first to fourth beams 120*a* to 120*d*.

For example, in transducer 100 of the present preferred embodiment in FIGS. 1 to 4, when the resonance frequency of each of first to fourth beams 120*a* to 120*d* is designed to be in the vicinity of 40 kHz, for each of first to fourth beams 120*a* to 120*d*, the material of piezoelectric layer 11 may be lithium niobate, the thickness of piezoelectric layer 11 may be about 1 μm, the thickness of each of first electrode layer 12 and second electrode layer 13 may be about 0.1 μm, the thickness of first support 14*a* may be about 0.8 μm, the thickness of second support 14*b* may be about 1.4 μm, and the shortest distance from first to fourth fixed ends 121*a* to 121*d* to first to fourth tips 122*a* to 122*d* of each of first to fourth beams 120*a* to 120*d* may be about 316 μm, length L of each of the first direction (X-axis direction) and the second direction (Y-axis direction) of first to fourth connection portions 130*a* to 130*d* may be about 77 μm, and the length of each of first to fourth fixed ends 121*a* to 121*d* when viewed from the multilayer direction may be about 786 μm.

Because transducer 100 of the present preferred embodiment includes first to fourth connection portions 130*a* to 130*d* having the above-described structure, the vibration in the fundamental vibration mode is likely to be generated, and the generation of the coupled vibration mode is reduced or prevented. For this reason, in the case where transducer 100 is used as the ultrasonic transducer, even when the ultrasonic wave having the same or substantially the same frequency component as the resonance frequency is detected, the phases of vibrations of first to fourth beams 120*a* to 120*d* are prevented from being different from each other. As a result, the phases of vibrations of first to fourth beams 120*a* to 120*d* are different from each other, so that the electric charge generated in piezoelectric layer 11 of each of first to fourth beams 120*a* to 120*d* is prevented from canceling each other in first electrode layer 12 or second electrode layer 13.

As described above, in transducer 100, the device characteristics as the ultrasonic transducer are improved.

Figure 13:
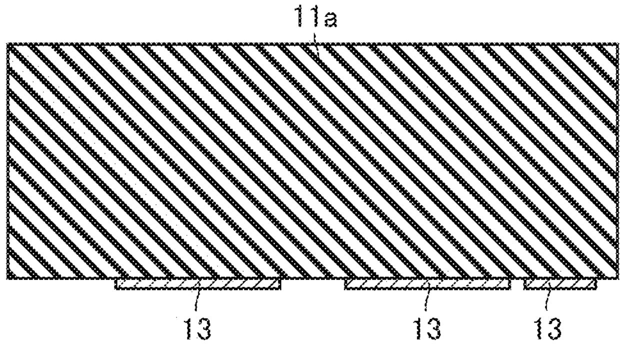
FIG. 13 is a sectional view illustrating a state in which a second electrode layer is provided on a piezoelectric single crystal substrate in a method for manufacturing a transducer according to a preferred embodiment of the present invention.

A non-limiting example of a method for manufacturing transducer 100 according to a preferred embodiment of the present invention will be described below. FIG. 13 is a sectional view illustrating the state in which the second electrode layer is provided on the piezoelectric single crystal substrate in the non-limiting example of a method for manufacturing the transducer. FIG. 13 and FIGS. 14 to 19 are illustrated in the same sectional view as FIG. 2.

As illustrated in FIG. 13, first, after the adhesion layer (not illustrated) is provided on the lower surface of piezoelectric single crystal substrate 11*a*, second electrode layer 13 is provided on the side opposite to piezoelectric single crystal substrate 11*a* of the adhesion layer. Second electrode layer 13 is formed to have a desired pattern by, for example, a vapor deposition lift-off method. Second electrode layer 13 is laminated over the entire or substantially the entire lower surface of piezoelectric single crystal substrate 11*a* by, for example, sputtering, and then a desired pattern may be formed by, for example, an etching method. Second electrode layer 13 and the adhesion layer may be epitaxially grown.

Figure 14:
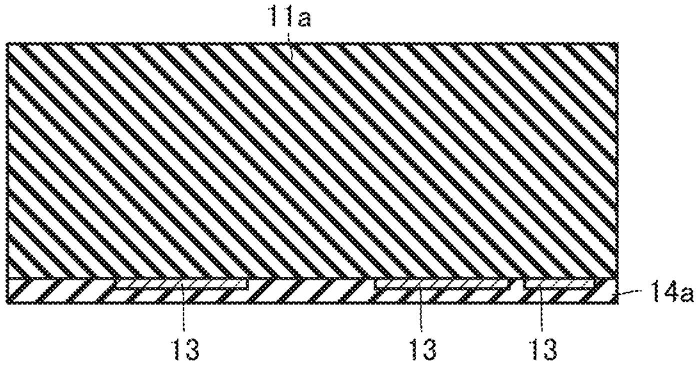
FIG. 14 is a sectional view illustrating a state in which a first support is provided in a method for manufacturing a transducer according to a preferred embodiment of the present invention.

FIG. 14 is a sectional view illustrating the state in which the first support is provided in the non-limiting example of a method for manufacturing the transducer. As illustrated in FIG. 14, first support 14*a* is provided on the lower surface of each of piezoelectric single crystal substrate 11*a* and second electrode layer 13 by, for example, a chemical vapor deposition (CVD) method, a physical vapor deposition (PVD) method, or the like. Immediately after first support 14*a* is provided, a portion of the lower surface of first support 14*a* located on the side opposite to second electrode layer 13 of first support 14*a* swells. For this reason, the lower surface of first support 14*a* is scraped and planarized by, for example, chemical mechanical polishing (CMP) or the like.

Figure 15:
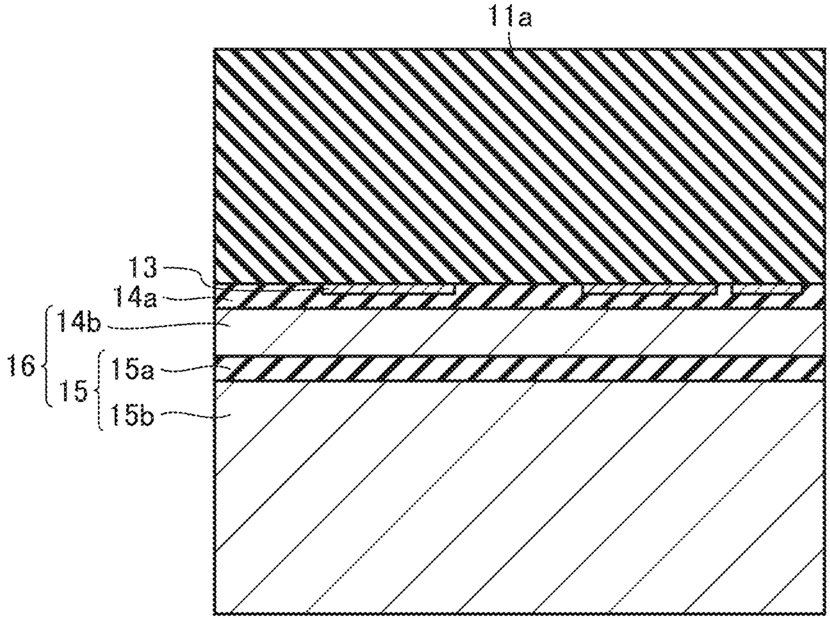
FIG. 15 is a sectional view illustrating a state in which a multilayer body is joined to the first support in a method for manufacturing a transducer according to a preferred embodiment of the present invention.

FIG. 15 is a sectional view illustrating the state in which the multilayer body is joined to the first support in the non-limiting example of a method for manufacturing the transducer. As illustrated in FIG. 15, multilayer body 16 including second support 14*b* and substrate layer 15 is joined to the lower surface of first support 14*a* by, for example, surface activation joining or atomic diffusion joining. In the present preferred embodiment, multilayer body 16 is, for example, a silicon on insulator (SOI) substrate. A yield of transducer 100 is improved by planarizing previously the upper surface of second support 14*b* by, for example, the CMP or the like. When second support 14*b* is made of low-resistance Si, second support 14*b* can define and function as the lower electrode layer, and in this case, the formation of second electrode layer 13 and CMP of the lower surface of first support 14*a* can be made unnecessary.

Figure 16:
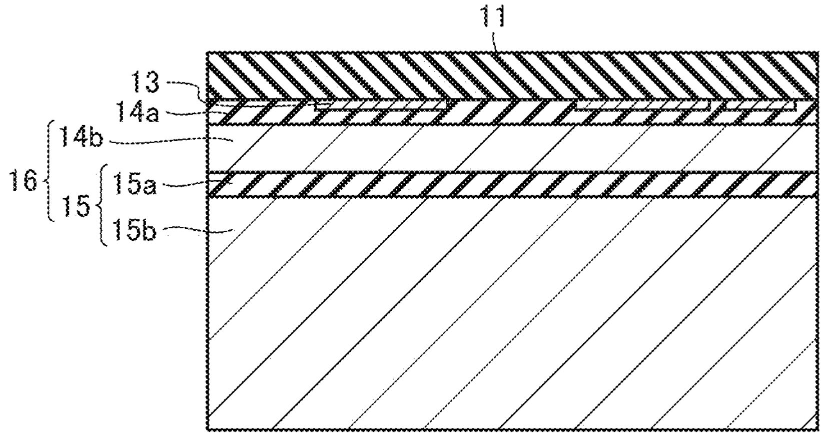
FIG. 16 is a sectional view illustrating a state in which the piezoelectric single crystal substrate is shaved to form a piezoelectric layer in a method for manufacturing a transducer according to a preferred embodiment of the present invention.

FIG. 16 is a sectional view illustrating the state in which the piezoelectric single crystal substrate is shaved to form the piezoelectric layer in the non-limiting example of a method for manufacturing the transducer. As illustrated in FIGS. 15 and 16, the upper surface of piezoelectric single crystal substrate 11*a* is ground with a grinder to be thinned. The upper surface of thinned piezoelectric single crystal substrate 11*a* is further polished by, for example, the CMP or the like to mold piezoelectric single crystal substrate 11*a* into piezoelectric layer 11.

The ion may be previously implanted on the upper surface side of piezoelectric single crystal substrate 11*a* to form a peeling layer, and the peeling layer may be peeled off to form piezoelectric single crystal substrate 11*a* into piezoelectric layer 11. In addition, the upper surface of piezoelectric single crystal substrate 11*a* after the peeling layer is peeled off may be further polished by, for example, the CMP or the like to form piezoelectric single crystal substrate 11*a* into piezoelectric layer 11.

Figure 17:
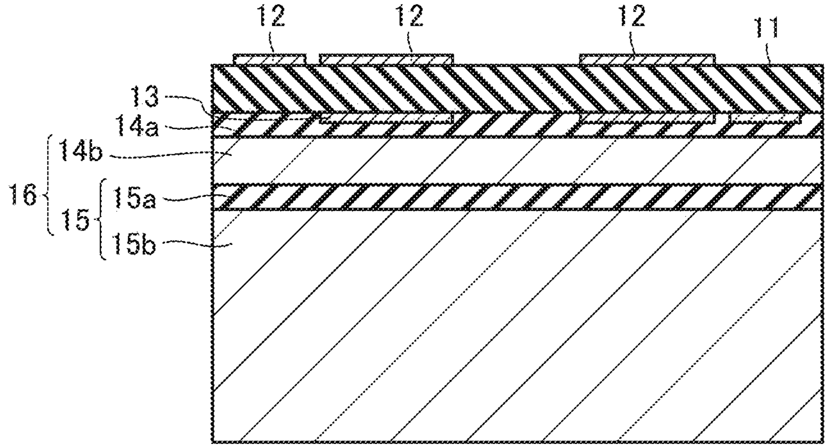
FIG. 17 is a sectional view illustrating a state in which a first electrode layer is provided on a piezoelectric layer in a method for manufacturing a transducer according to a preferred embodiment of the present invention.

FIG. 17 is a sectional view illustrating the state in which the first electrode layer is provided on the piezoelectric layer in the non-limiting example of a method for manufacturing the transducer. As illustrated in FIG. 17, after the adhesion layer (not illustrated) is provided on the upper surface of piezoelectric layer 11, first electrode layer 12 is provided on the side opposite to piezoelectric layer 11 of the adhesion layer. First electrode layer 12 is formed to have the desired pattern by, for example, the vapor deposition lift-off method. First electrode layer 12 is laminated over the entire or substantially the entire upper surface of piezoelectric layer 11 by, for example, sputtering, and then a desired pattern may be formed by, for example, an etching method. First electrode layer 12 and the adhesion layer may be epitaxially grown.

Figure 18:
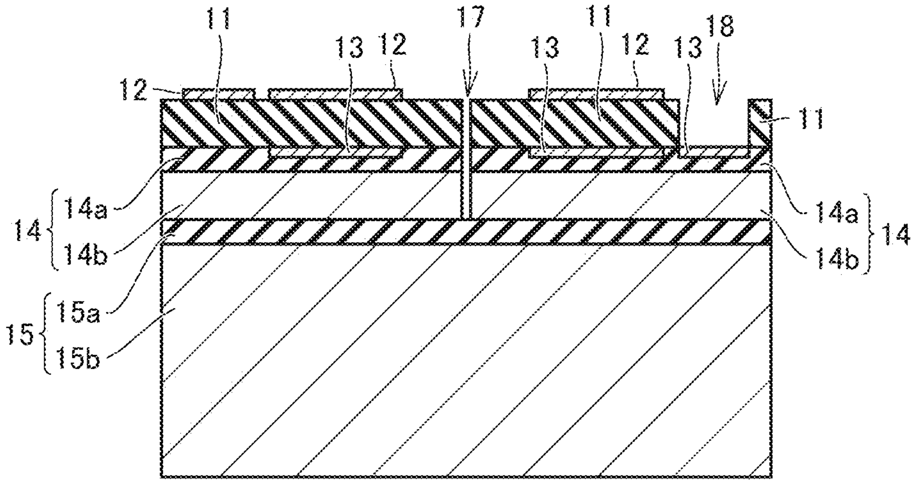
FIG. 18 is a sectional view illustrating a state in which a groove and a recess are provided in a method for manufacturing a transducer according to a preferred embodiment of the present invention.

FIG. 18 is a sectional view illustrating the state in which a groove and a recess are provided in the non-limiting example of a method for manufacturing the transducer. As illustrated in FIG. 18, in the region corresponding to the region inside base 110 of transducer 100 as viewed in the multilayer direction, dry etching is performed by, for example, reactive ion etching (RIE) or the like to form slits in piezoelectric layer 11 and first support 14*a*. The slit may be formed by, for example, wet etching using nitrohydrofluoric acid or the like. Furthermore, second support 14*b* exposed to the slit is etched by, for example, deep reactive ion etching (DRIE) such that the slit reaches the upper surface of substrate layer 15. Thus, a groove 17 in FIG. 18 corresponding to split slit 142 in transducer 100 in FIGS. 1 and 2 is formed.

Furthermore, as illustrated in FIG. 18, in a portion corresponding to base 110 of transducer 100, piezoelectric layer 11 is etched such that a portion of second electrode layer 13 is exposed by the dry etching or the wet etching. Consequently, a recess 18 is formed.

Figure 19:
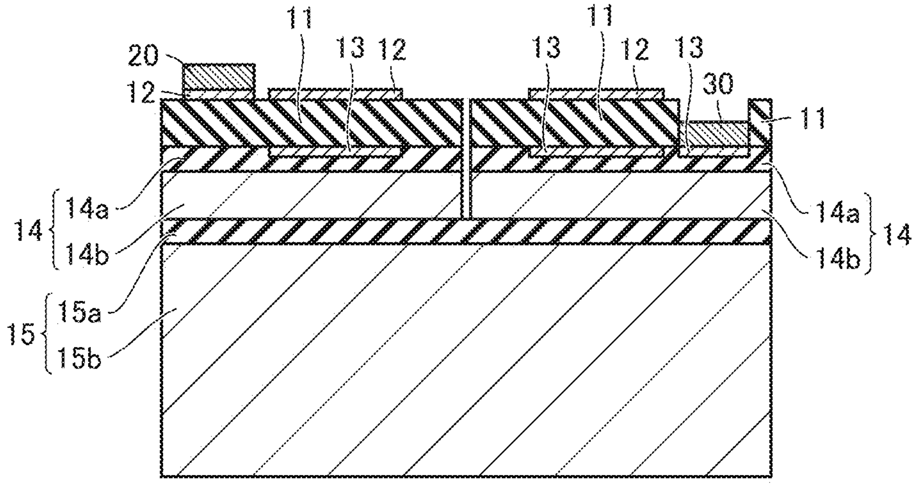
FIG. 19 is a partial sectional view illustrating a state in which a first connection electrode layer and a second electrode connection layer are provided in a method for manufacturing a transducer according to a preferred embodiment of the present invention.

FIG. 19 is a partial sectional view illustrating the state in which the first connection electrode layer and the second electrode connection layer are provided in the non-limiting example of a method for manufacturing the transducer. As illustrated in FIG. 19, in a portion corresponding to base 110, after the adhesion layer (not illustrated) is provided on each of first electrode layer 12 and second electrode layer 13, first connection electrode layer 20 and second connection electrode layer 30 are provided on the upper surface of each adhesion layer by the vapor deposition lift-off method. First connection electrode layer 20 and second connection electrode layer 30 are laminated over the entire or substantially the entire surfaces of piezoelectric layer 11, first electrode layer 12, and exposed second electrode layer 13 by non-limiting example of a sputtering, and then a desired pattern may be formed by the etching method.

Finally, a portion of second substrate layer 15*b* in substrate layer 15 is removed by the DRIE, and then a portion of first substrate layer 15*a* is removed by the RIE. Thus, as illustrated in FIG. 2, first to fourth beams 120*a* to 120*d* and first to fourth connection portions 130*a* to 130*d* are formed while opening 101 is provided.

Through the above processes, transducer 100 of the present preferred embodiment of the present invention in FIGS. 1 to 4 is manufactured.

As described above, in transducer 100 of the present preferred embodiment, first connection portion 130*a* connects first tip 122*a* and second tip 122*b* to each other. First connection portion 130*a* is surrounded by split slit 142 connecting center 122*ac* of first tip 122*a*, the center of base 110, and center 122*bc* of second tip 122*b*, first tip 122*a*, and second tip 122*b*. Thus, the entire or substantially the entire first beam 120*a* including first tip 122*a* of first beam 120*a* and entire second beam 120*b* including second tip 122*b* of second beam 120*b* can be resonantly vibrated in synchronization with each other. In addition, not all of first to fourth beams 120*a* to 120*d* are connected to each other, but only the adjacent beams are connected to each other, so that the beams (for example, first beam 120*a* and third beam 120*c*) in which the tips are opposite to each other can be displaced so as to be separated from each other. Therefore, obstruction of mutual vibration between the opposing beams can be reduced or prevented. As a result, the entire or substantially the entire beams can be synchronized and resonantly vibrated without obstructing mutual vibration between the beams.

In the present preferred embodiment, first connection portion 130*a* has the meandering shape. Thus, the internal stress in first connection portion 130*a* can be reduced or prevented. In addition, because first connection portion 130*a* has the meandering shape, the connection between first beam 120*a* and second beam 120*b* can be prevented from becoming too strong, and the vibration between first beam 120*a* and second beam 120*b* can be prevented from being obstructed.

In the present preferred embodiment, the longitudinal portions 131 arranged in the second direction (Y-axis direction) in the plurality of longitudinal portions 131 are alternately connected at the first end and the second end in the first direction (X-axis direction) by the corresponding short portion of the plurality of short portions 132A, 132B. Thus, the number of turns of the meandering shape of first connection portion 130*a* can be made plural, and the internal stress in first connection portion 130*a* can be effectively reduced or prevented. In addition, as the number of turns of the meandering shape of first connection portion 130*a* increases, the connection between first beam 120*a* and second beam 120*b* can be effectively prevented from becoming too strong, and the vibration of first beam 120*a* and second beam 120*b* can be prevented from being further obstructed.

In the present preferred embodiment, width Wm in the second direction (Y-axis direction) of each of the plurality of longitudinal portions 131 is larger than width Ws in the second direction (Y-axis direction) of first and second intermediate slits 143*a*, 143*b* between longitudinal portions 131 adjacent to each other in the plurality of longitudinal portions 131. Thus, in transmission and reception of the sound wave in first connection portion 130*a*, the amount of air (medium) transmitted and received by longitudinal portion 131 is larger than the amount of air (medium) passing through first intermediate slit 143*a* and second intermediate slit 143*b*, so that transmission and reception efficiency can be maintained high.

In the present preferred embodiment, the width in the first direction (X-axis direction) of at least one of short portions 132A, 132B is wider than the width in the second direction (Y-axis direction) of each of the plurality of longitudinal portions 131. Thus, short portions 132A, 132B that are stress concentration spots in first connection portion 130*a* can be thickened and strengthened, and the damage to first connection portion 130*a* can be reduced or prevented.

In the present preferred embodiment, the lengths of the plurality of longitudinal portions 131 are the same or substantially the same. Thus, the bias of the stress distribution generated in first connection portion 130*a* can be reduced to prevent the damage of first connection portion 130*a*.

In the present preferred embodiment, each of the plurality of first intermediate slits 143*a* and at least one second intermediate slit 143*b* is located in parallel or substantially in parallel with first split slit 142*a*. Thus, longitudinal portions 131 adjacent to each other in the first direction (X-axis direction) can be prevented from coming into contact with each other when transducer 100 is driven.

In the present preferred embodiment, in the region surrounded by split slit 142, first tip 122*a*, and second tip 122*b*, first connection portion 130*a* has an area greater than or equal to about 90% and less than about 100%, for example. High sound wave transmission and reception efficiency in first connection portion 130*a* can be maintained.

In the present preferred embodiment, first to fourth beams 120*a* to 120*d* and first to fourth connection portions 130*a* to 130*d* are provided. Thus, the volume of the medium that can act when transducer 100 is driven increases, and the sound pressure that can be transmitted and received can be increased.

In the present preferred embodiment, the plurality of layers 10 include piezoelectric layer 11, first electrode layer 12, and second electrode layer 13. Piezoelectric layer 11 is made of the single crystal piezoelectric body. First electrode layer 12 is disposed on one side of piezoelectric layer 11 in the multilayer direction of the plurality of layers 10. Second electrode layer 13 is disposed on the other side of piezoelectric layer 11 so as to be opposed to at least a portion of first electrode layer 12 with piezoelectric layer 11 interposed therebetween. Thus, transducer 100 can be driven by the piezoelectric effect. Transducer 100 may be a capacitively-driven transducer.

In the present preferred embodiment, the axial direction of the virtual axis when the polarization axis of the single crystal piezoelectric body is projected from the multilayer direction onto the virtual plane orthogonal or substantially orthogonal to the multilayer direction extends in the same direction in both first beam 120*a* and second beam 120*b*, and intersects with the extending direction of each of first beam 120*a* and second beam 120*b* when viewed from the multilayer direction. As a result, even when the thermal stress is generated in each of first beam 120*a* and second beam 120*b* in transducer 100 in which piezoelectric layer 11 is made of the single-crystal piezoelectric body having a polarization axis, the bias of the stress distribution generated in first connection portion 130*a* can be reduced to reduce or prevent damage of first connection portion 130*a*.

In the present preferred embodiment, when viewed from the multilayer direction, the angle formed by the extending direction of each of first beam 120*a* and second beam 120*b* and the axial direction of the virtual axis is greater than or equal to about 40 degrees and less than or equal to about 50 degrees, or greater than or equal to about 130 degrees and less than or equal to about 140 degrees, for example. As a result, even when the thermal stress is generated in first beam 120*a* and second beam 120*b*, because each of first beam 120*a* and second beam 120*b* has the same or substantially the same stress distribution in the extending direction, the warpage of each of first beam 120*a* and second beam 120*b* is the same or substantially the same. As a result, degradation of the device characteristics of transducer 100 can be reduced or prevented.

In the present preferred embodiment, piezoelectric layer 11 is made, for example, of lithium niobate ($LiNbO_3$) or lithium tantalate ($LiTaO_3$). Thus, the piezoelectric characteristic of piezoelectric layer 11 can be improved, so that the device characteristics of transducer 100 can be improved.

Modifications different from transducer 100 of the present preferred embodiment only in the configuration of the connection portion will be described below. The description of the same or substantially the same configuration as that of transducer 100 according to the present preferred embodiment will not be repeated.

Figure 20:
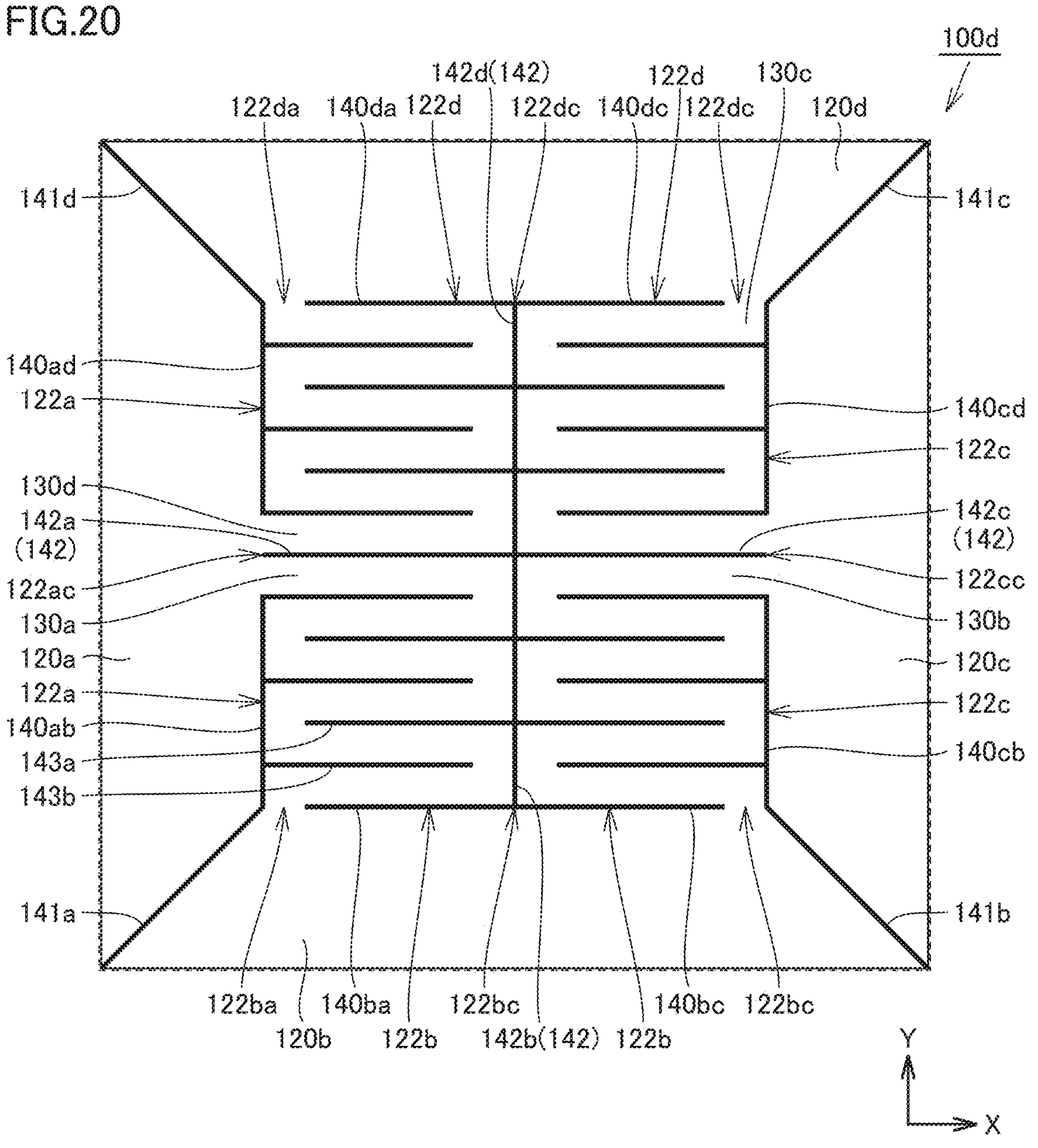
FIG. 20 is a partial plan view illustrating a transducer according to a fourth modification of a preferred embodiment of the present invention.

FIG. 20 is a partial plan view illustrating a transducer according to a fourth modification of a preferred embodiment of the present invention. In FIG. 20, the same portion as that in FIG. 3 is illustrated in an enlarged manner.

As illustrated in FIG. 20, in a transducer 100*d* according to the fourth modification, the number n of turns of the meandering shape of each of first to fourth connection portions 130*a* to 130*d* is, for example, 5.

First defining slit 140*ba* is connected to the tip of second split slit 142*b*. Second defining slit 140*bc* is connected to the tip of second split slit 142*b*. Third defining slit 140*dc* is connected to the tip of fourth split slit 142*d*. Fourth defining slit 140*da* is connected to the tip of fourth split slit 142*d*.

First connection portion 130*a* is connected to center 122*ac* of first tip 122*a* and an end 122*ba* of second tip 122*b* closer to first beam 120*a*. Second connection portion 130*b* is connected to an end 122*bc* of second tip 122*b* closer to third beam 120*c* and a center 122*cc* of third tip 122*c*. Third connection portion 130*c* is connected to center 122*cc* of third tip 122*c* and an end 122*dc* of fourth tip 122*d* closer to third beam 120*c*. Fourth connection portion 130*d* is connected to an end 122*da* of fourth tip 122*d* closer to first beam 120*a* and center 122*ac* of first tip 122*a*.

Figure 21:
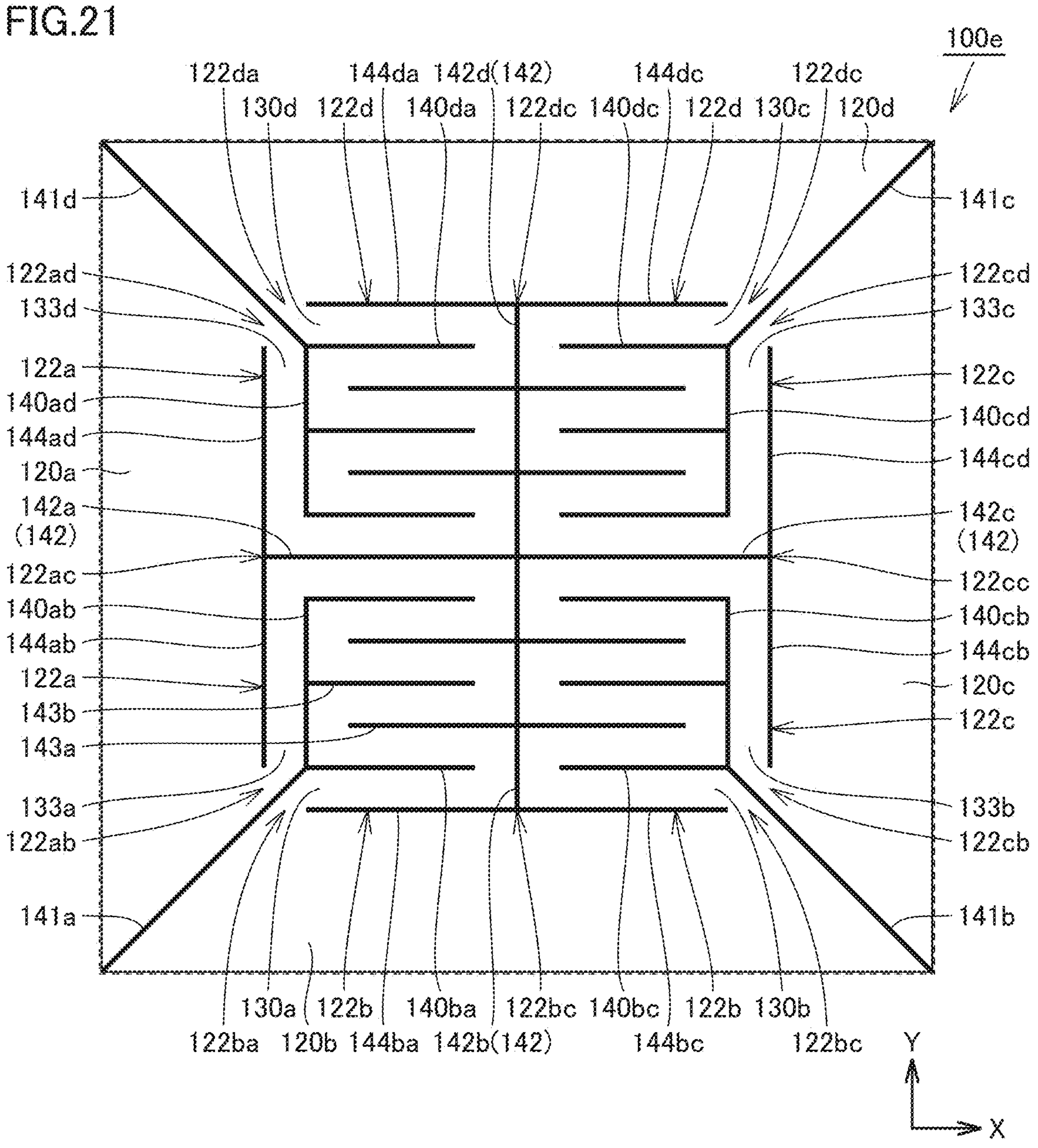
FIG. 21 is a partial plan view illustrating a transducer according to a fifth modification of a preferred embodiment of the present invention.

FIG. 21 is a partial plan view illustrating a transducer according to a fifth modification of a preferred embodiment of the present invention. In FIG. 21, the same portion as that in FIG. 3 is illustrated in an enlarged manner.

As illustrated in FIG. 21, in a transducer 100*e* according to the fifth modification, first connection portion 130*a* includes a first additional connection portion 133*a* extending in the Y-axis direction at a connection position with first tip 122*a* of first beam 120*a*.

A first bent slit 144*ab* extending from first split slit 142*a* to the other side in the Y-axis direction on the side of first beam 120*a* with respect to first connection slit 140*ab* is provided in first connection portion 130*a*. A first extension slit 144*ba* extending from second split slit 142*b* to the other side in the X-axis direction on the side of second beam 120*b* with respect to first defining slit 140*ba* is provided.

First additional connection portion 133*a* extends to the other side in the Y-axis direction between first connection slit 140*ab* and first bent slit 144*ab*. First connection portion 130*a* extends to the other side in the X-axis direction between first defining slit 140*ba* and first extension slit 144*ba*. Thus, first connection portion 130*a* is connected to an end 122*ab* of first tip 122*a* closer to second beam 120*b* and an end 122*ba* of second tip 122*b* closer to first beam 120*a*.

Second connection portion 130*b* includes a second additional connection portion 133*b* extending in the Y-axis direction at a connecting position with third tip 122*c* of third beam 120*c*.

A second bent slit 144*cb* extending from third split slit 142*c* to the other side in the Y-axis direction on the side of third beam 120*c* with respect to second connection slit 140*cb* is provided in second connection portion 130*b*. A second extension slit 144*bc* extending from second split slit 142*b* to one side in the X-axis direction is provided on the side of second beam 120*b* with respect to second defining slit 140*bc*.

Second additional connection portion 133*b* extends to the other side in the Y-axis direction between second connection slit 140*cb* and second bent slit 144*cb*. Second connection portion 130*b* extends to one side in the X-axis direction between second defining slit 140*bc* and second extension slit 144*bc*. Thus, second connection portion 130*b* is connected to an end 122*bc* of second tip 122*b* closer to third beam 120*c* and an end 122*cb* of third tip 122*c* closer to second beam 120*b*.

Third connection portion 130*c* includes a third additional connection portion 133*c* extending in the Y-axis direction at a connecting position with third tip 122*c* of third beam 120*c*.

A third bent slit 144*cd* extending from third split slit 142*c* to one side in the Y-axis direction on the side of third beam 120*c* with respect to third connection slit 140*cd* is provided in third connection portion 130*c*. In addition, a third extension slit 144*dc* extending from fourth split slit 142*d* to one side in the X-axis direction is provided on the side of fourth beam 120*c* with respect to third defining slit 140*dc*.

Third additional connection portion 133*c* extends to one side in the Y-axis direction between third connection slit 140*cd* and third bent slit 144*cd*. Third connection portion 130*c* extends to one side in the X-axis direction between third defining slit 140*dc* and third extension slit 144*dc*. Thus, third connection portion 130*c* is connected to an end 122*cd* of third tip 122*c* closer to fourth beam 120*d* and an end 122*dc* of fourth tip 122*d* closer to third beam 120*c*.

Fourth connection portion 130*d* includes a fourth additional connection portion 133*d* extending in the Y-axis direction at a connecting position with first tip 122*a* of first beam 120*a*.

A fourth bent slit 144*ad* extending from first split slit 142*a* to one side in the Y-axis direction on the side of first beam 120*a* with respect to fourth connection slit 140*ad* is provided in fourth connection portion 130*d*. A fourth extension slit 144*da* extending from fourth split slit 142*d* towards the other side in the X-axis direction is provided on the side of fourth beam 120*c* with respect to fourth defining slit 140*da*.

Fourth additional connection portion 133*d* extends to one side in the Y-axis direction between fourth connection slit 140*ad* and fourth bent slit 144*ad*. Fourth connection portion 130*d* extends to the other side in the X-axis direction between fourth defining slit 140*da* and fourth extension slit 144*da*. Accordingly, fourth connection portion 130*d* is connected to end 122*da* of fourth tip 122*d* closer to first beam 120*a* and an end 122*ad* of first tip 122*a* closer to fourth beam 120*d*.

In the fifth modification, the ends of the tips of first to fourth beams 120*a* to 120*d* are connected to first to fourth connection portions 130*a* to 130*d*, respectively, such that the balance of vibrations of first to fourth beams 120*a* to 120*d* is improved, and first to fourth additional connection portions 133*a* to 133*d* are provided, such that the stress distribution in first to fourth connection portions 130*a* to 130*d* can be made uniform or substantially uniform.

Figure 22:
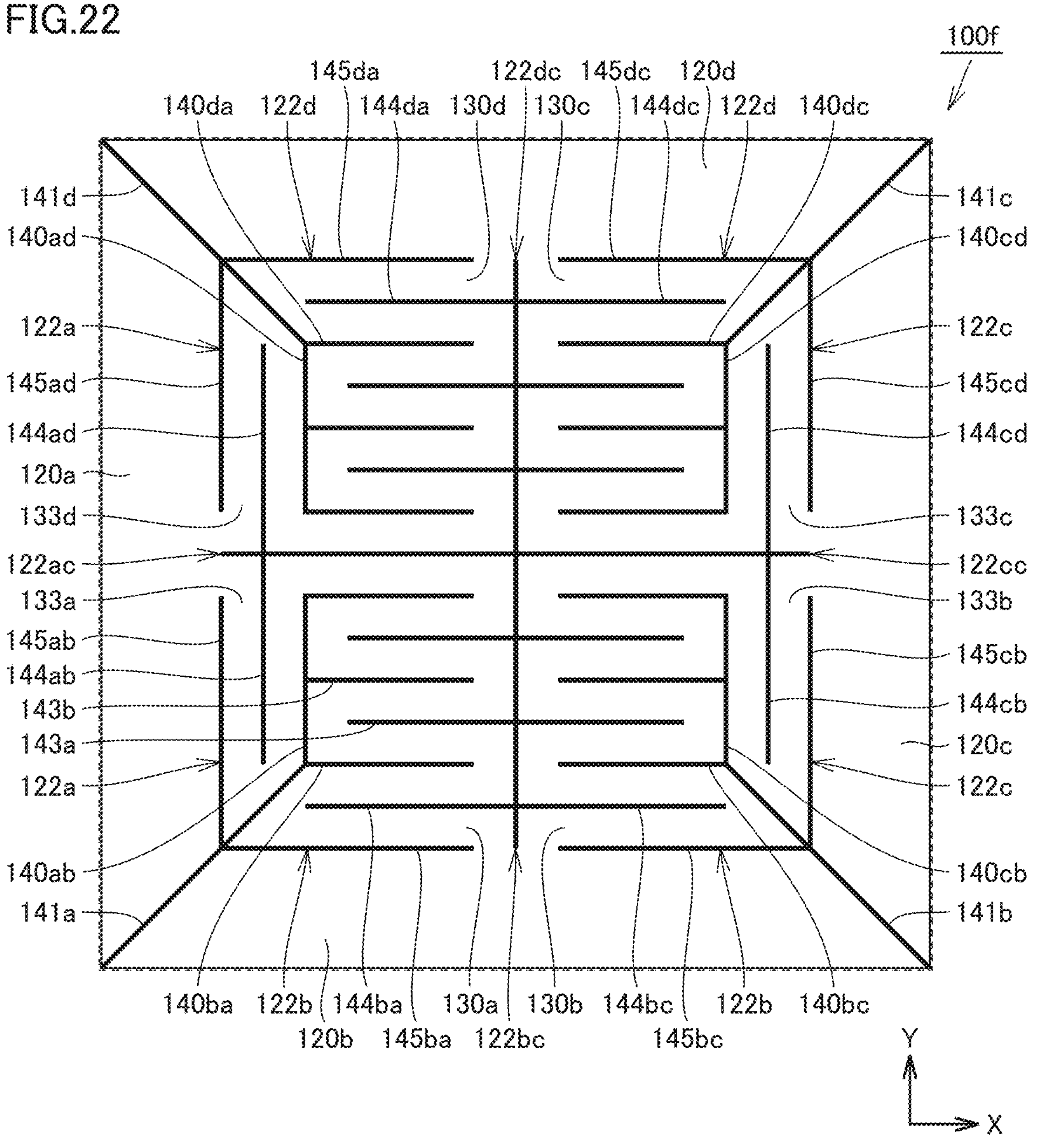
FIG. 22 is a partial plan view illustrating a transducer according to a sixth modification of a preferred embodiment of the present invention.

FIG. 22 is a partial plan view illustrating a transducer according to a sixth modification of a preferred embodiment of the present invention. In FIG. 22, the same portion as that in FIG. 3 is illustrated in an enlarged manner. In the description of the sixth modification, the description of the same or substantially the same configuration as transducer 100*e* according to the fifth modification of the preferred embodiment of the present invention will not be repeated.

As illustrated in FIG. 22, in a transducer 100*f* according to the sixth modification, first connection portion 130*a* includes first additional connection portion 133*a* folded back while extending in the Y-axis direction at the connection position with first tip 122*a* of first beam 120*a*.

A first additional bent slit 145*ab* extending from first slit 141*a* to one side in the Y-axis direction on the side of first beam 120*a* with respect to first bent slit 144*ab* is provided in first connection portion 130*a*. First additional extension slit 145*ba* extending from first slit 141*a* to one side in the X-axis direction is provided on the side of second beam 120_b_ with respect to first extension slit 144_ba_.

First additional connection portion 133_a_ extends to one side in the Y-axis direction between first bent slit 144_ab_ and first additional bent slit 145_ab_. First connection portion 130_a_ extends to one side in the X-axis direction between first extension slit 144_ba_ and first additional extension slit 145_ba_. Thus, first connection portion 130_a_ is connected to center 122_ac_ of first tip 122_a_ and center 122_bc_ of second tip 122_b_.

Second connection portion 130_b_ includes second additional connection portion 133_b_ that is folded back while extending in the Y-axis direction at the connection position with third tip 122_c_ of the third beam 120_c_.

A second additional bent slit 145_cb_ extending from second slit 141_b_ to one side in the Y-axis direction on the side of third beam 120_c_ with respect to second bent slit 144_cb_ is provided in second connection portion 130_b_. A second additional extension slit 145_bc_ extending from second slit 141_b_ to the other side in the X-axis direction is provided on the side of second beam 120_b_ with respect to second extension slit 144_bc_.

Second additional connection portion 133_b_ extends to one side in the Y-axis direction between second bent slit 144_cb_ and second additional bent slit 145_cb_. Second connection portion 130_b_ extends to the other side in the X-axis direction between second extension slit 144_bc_ and second additional extension slit 145_bc_. Thus, second connection portion 130_b_ is connected to center 122_bc_ of second tip 122_b_ and center 122_cc_ of third tip 122_c_.

Third connection portion 130_c_ includes third additional connection portion 133_c_ that is folded back while extending in the Y-axis direction at the connection position with third tip 122_c_ of the third beam 120_c_.

A third additional bent slit 145_cd_ extending from third slit 141_c_ to the other side in the Y-axis direction on the side of third beam 120_c_ with respect to third bent slit 144_cd_ is provided in third connection portion 130_c_. In addition, a third additional extension slit 145_dc_ extending from third slit 141_c_ to the other side in the X-axis direction is provided on the side of fourth beam 120_d_ with respect to third extension slit 144_dc_.

Third additional connection portion 133_c_ extends to the other side in the Y-axis direction between third bent slit 144_cd_ and third additional bent slit 145_cd_. Third connection portion 130_c_ extends to the other side in the X-axis direction between third extension slit 144_dc_ and third additional extension slit 145_dc_. Thus, third connection portion 130_c_ is connected to center 122_cc_ of third tip 122_c_ and center 122_dc_ of fourth tip 122_d_.

Fourth connection portion 130_d_ includes fourth additional connection portion 133_d_ that is folded back while extending in the Y-axis direction at the connection position with first tip 122_a_ of first beam 120_a_.

A fourth additional bent slit 145_ad_ extending from first slit 141_a_ to the other side in the Y-axis direction on the side of first beam 120_a_ with respect to fourth bent slit 144_ad_ is provided in fourth connection portion 130_d_. A fourth additional extension slit 145_da_ extending from first slit 141_a_ to one side in the X-axis direction is provided on the side of fourth beam 120_d_ with respect to fourth extension slit 144_da_.

Fourth additional connection portion 133_d_ extends to the other side in the Y-axis direction between fourth bent slit 144_ad_ and fourth additional bent slit 145_ad_. Fourth connection portion 130_d_ extends to one side in the X-axis direction between fourth extension slit 144_da_ and fourth additional extension slit 145_da_. Thus, fourth connection portion 130_d_ is connected to center 122_dc_ of fourth tip 122_d_ and center 122_ac_ of first tip 122_a_.

In the sixth modification, first to fourth connection portions 130_a_ to 130_d_ are connected to the centers of the tips of first to fourth beams 120_a_ to 120_d_, respectively, so that the balance of vibrations of first to fourth beams 120_a_ to 120_d_ is improved, and first to fourth additional connection portions 133_a_ to 133_d_ are folded back, so that the stress distribution in first to fourth connection portions 130_a_ to 130_d_ can be effectively made uniform or substantially uniform.

Figure 23:
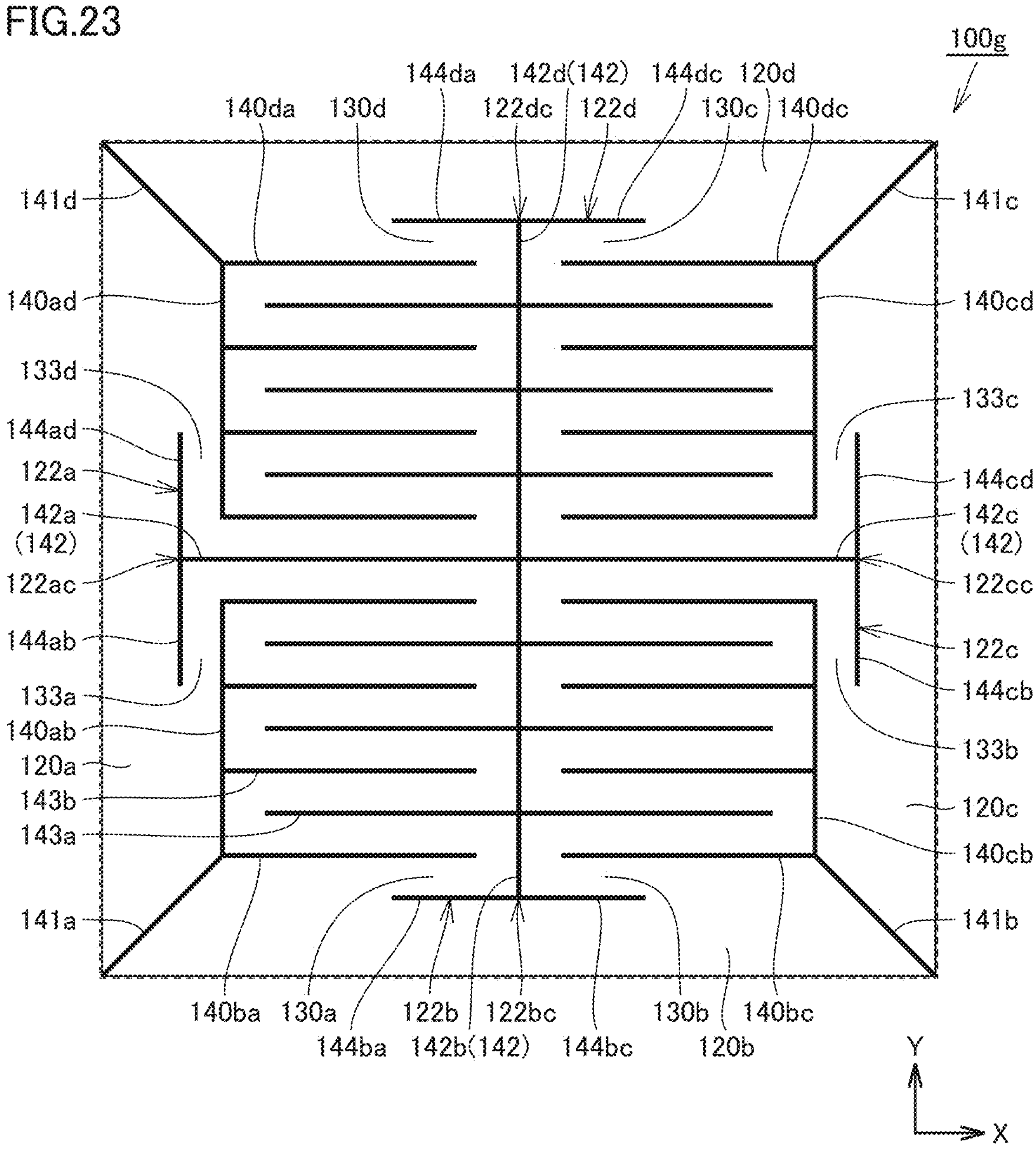
FIG. 23 is a partial plan view illustrating a transducer according to a seventh modification of a preferred embodiment of the present invention.

FIG. 23 is a partial plan view illustrating a transducer according to a seventh modification of a preferred embodiment of the present invention. In FIG. 23, the same portion as that in FIG. 3 is illustrated in an enlarged manner. In the description of the seventh modification, the description of the same or substantially the same configuration as transducer 100_e_ according to the fifth modification of the preferred embodiment of the present invention will not be repeated.

As illustrated in FIG. 23, in a transducer 100_g_ according to the seventh modification, first connection portion 130_a_ is connected to a position shifted by a certain distance from center 122_ac_ of first tip 122_a_ to the other side in the Y-axis direction and a position shifted by the certain distance from center 122_bc_ of second tip 122_b_ to the other side in the X-axis direction.

Second connection portion 130_b_ is connected to a position shifted by the certain distance from center 122_bc_ of second tip 122_b_ to one side in the X-axis direction and a position shifted by the certain distance from center 122_cc_ of third tip 122_c_ to the other side in the Y-axis direction.

Third connection portion 130_c_ is connected to a position shifted by the certain distance from center 122_cc_ of third tip 122_c_ to one side in the Y-axis direction and a position shifted by the certain distance from center 122_dc_ of fourth tip 122_d_ to one side in the X-axis direction.

Fourth connection portion 130_d_ is connected to a position shifted by the certain distance from center 122_dc_ of fourth tip 122_d_ to the other side in the X-axis direction and a position shifted by the certain distance from center 122_ac_ of first tip 122_a_ to the one side in the Y-axis direction.

In the seventh modification, the connection positions and connection angles of first to fourth beams 120_a_ to 120_d_ and first to fourth connection portions 130_a_ to 130_d_ are uniform or substantially uniform, and the stress distribution in first to fourth connection portions 130_a_ to 130_d_ can be effectively uniformized while the balance of vibrations of first to fourth beams 120_a_ to 120_d_ is improved.

Figure 24:
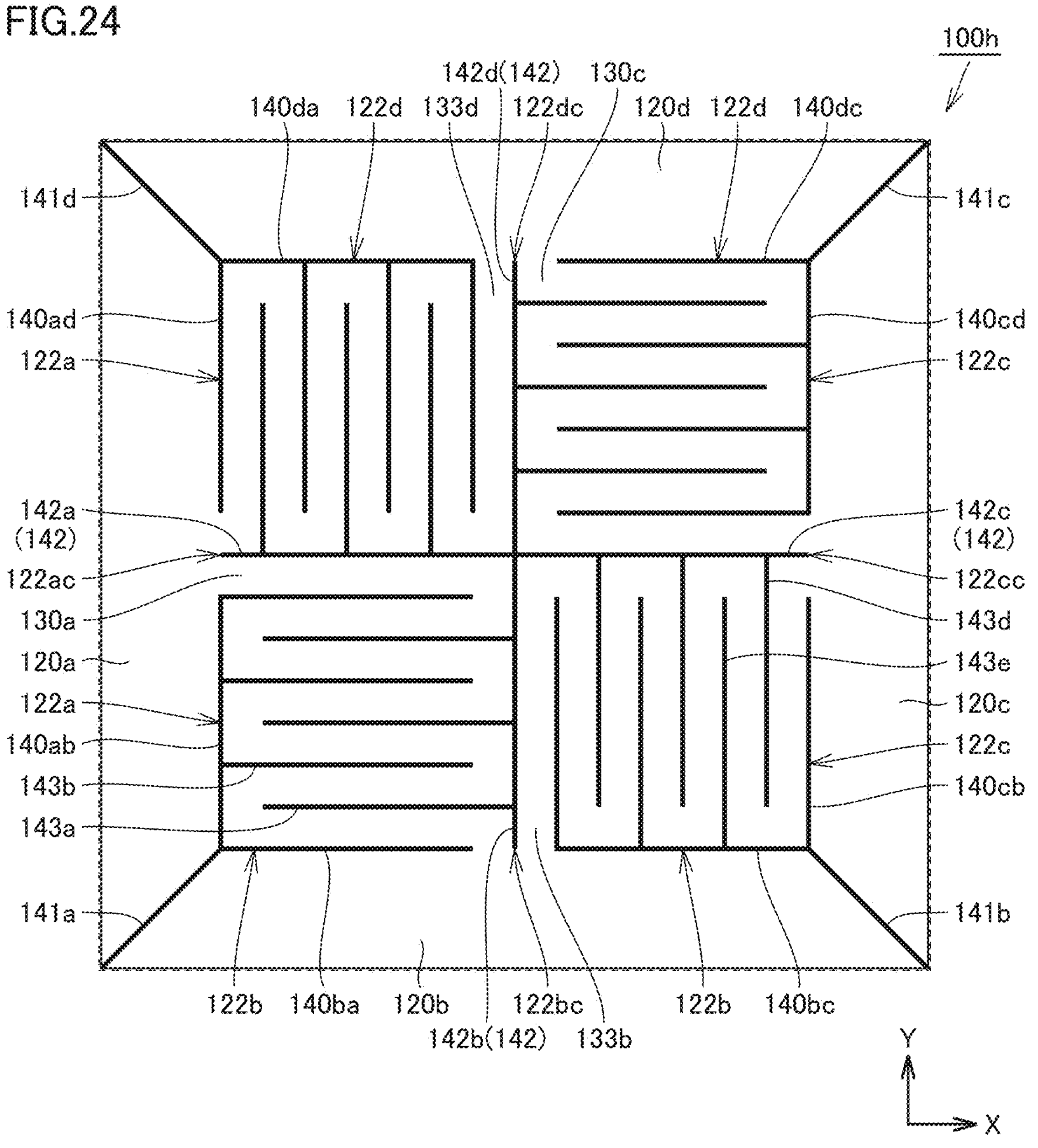
FIG. 24 is a partial plan view illustrating a transducer according to an eighth modification of a preferred embodiment of the present invention.

FIG. 24 is a partial plan view illustrating a transducer according to an eighth modification of a preferred embodiment of the present invention. In FIG. 24, the same portion as that in FIG. 3 is illustrated in an enlarged manner.

As illustrated in FIG. 24, in a transducer 100_h_ according to the eighth modification, first to fourth connection portions 130_a_ to 130_d_ are arranged point-symmetrically with respect to center C of base 110. In each of second connection portion 130_b_ and fourth connection portion 130_d_, each of the plurality of first intermediate slits 143_d_ and the plurality of second intermediate slits 143_e_ extends in the Y-axis direction.

Figure 25:
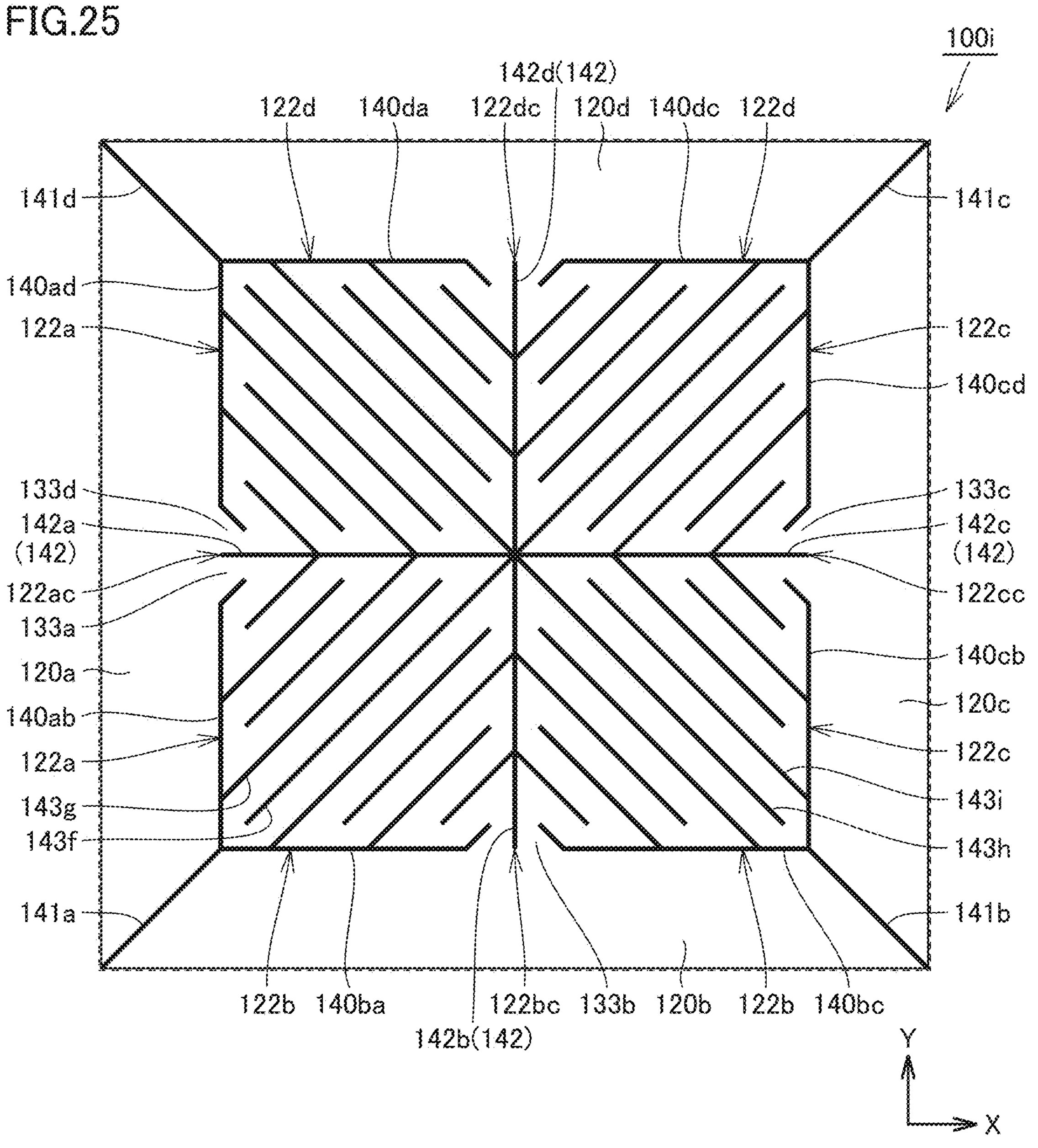
FIG. 25 is a partial plan view illustrating a transducer according to a ninth modification of a preferred embodiment of the present invention.

FIG. 25 is a partial plan view illustrating a transducer according to a ninth modification of a preferred embodiment of the present invention. In FIG. 25, the same portion as that in FIG. 3 is illustrated in an enlarged manner.

As illustrated in FIG. 25, in a transducer 100*i* according to the ninth modification, first to fourth connection portions 130*a* to 130*d* are arranged point-symmetrically with respect to center C of base 110. In each of first connection portion 130*a* and third connection portion 130*c*, each of a plurality of first intermediate slits 143*f* and a plurality of second intermediate slits 143*g* extends in the direction of about 45° with respect to the X-axis direction. In each of second connection portion 130*b* and fourth connection portion 130*d*, each of a plurality of first intermediate slits 143*h* and a plurality of second intermediate slits 143*i* extends in the direction of about 135° with respect to the X-axis direction.

In the description of the above preferred embodiments and modifications, configurations that can be combined may be combined with each other.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A transducer comprising:

an annular base;

a first beam including a first fixed end connected to the base and a first tip located closer to a center of the base on a side opposite to the first fixed end, the first beam extending from the first fixed end towards the first tip;

a second beam adjacent to the first beam in a circumferential direction of the base, including a second fixed end connected to the base and a second tip located closer to a center of the base on a side opposite to the second fixed end, and extending from the second fixed end towards the second tip; and a first connection portion connecting the first tip and the second tip to each other; wherein the first connection portion is surrounded by a split slit connecting a center of the first tip, the center of the base, and a center of the second tip, the first tip, and the second tip.

2. The transducer according to claim 1, wherein the first connection portion has a meandering shape.

3. The transducer according to claim 1, wherein the first connection portion includes:

a plurality of longitudinal portions extending along a first direction from the first fixed end towards the first tip; and at least one short portion extending along a second direction from the second fixed end towards the second tip and connecting ends of longitudinal portions adjacent to each other in the first direction in the plurality of longitudinal portions to each other.

4. The transducer according to claim 3, wherein the at least one short portion includes a plurality of short portions; and longitudinal portions arranged in the second direction in the plurality of longitudinal portions are alternately connected at a first end and a second end in the first direction by corresponding short portions of the plurality of short portions.

5. The transducer according to claim 3, wherein a width in the second direction of each of the plurality of longitudinal portions is wider than a width in the second direction of an intermediate slit between adjacent longitudinal portions of the plurality of longitudinal portions.

6. The transducer according to claim 3, wherein a width in the first direction of the at least one short portion is wider than a width in the second direction of each of the plurality of longitudinal portions.

7. The transducer according to claim 3, wherein lengths of the plurality of longitudinal portions are the same or substantially the same as each other.

8. The transducer according to claim 1, wherein the split slit includes:

a first split slit extending along a first direction from the first fixed end towards the first tip and connecting the center of the first tip and the center of the base; and a second split slit extending along a second direction from the second fixed end towards the second tip and connecting the center of the second tip and the center of the base; and the first connection portion includes:

a plurality of first intermediate slits extending from the second split slit towards the first tip of the first beam; and at least one second intermediate slit positioned one by one between first intermediate slits adjacent to each other of the plurality of first intermediate slits and extending from a tip side of the first beam towards the second split slit.

9. The transducer according to claim 8, wherein the at least one second intermediate slit includes a plurality of second intermediate slits in the first connection portion; and the plurality of first intermediate slits and the plurality of second intermediate slits are alternately arranged one by one in the second direction.

10. The transducer according to claim 8, wherein each of the plurality of first intermediate slits and the at least one second intermediate slit is in parallel or substantially in parallel with the first split slit.

11. The transducer according to claim 8, wherein a dimension of a shortest distance between a first intermediate slit of the plurality of first intermediate slits and a second intermediate slit of the at least one second intermediate slit adjacent to each other is larger than a dimension of a width in the second direction of each of the plurality of first intermediate slits and a dimension of a width in the second direction of the at least one second intermediate slit.

12. The transducer according to claim 8, wherein a dimension of a shortest distance between the at least one second intermediate slit and the second split slit is larger than a dimension of a shortest distance between a first intermediate slit of the plurality of first intermediate slits and a second intermediate slit of the at least one intermediate slit adjacent to each other.

13. The transducer according to claim 8, wherein a length of each of the plurality of first intermediate slits and a length of the at least one second intermediate slit are the same or substantially the same as each other.

14. The transducer according to claim 1, wherein the first connection portion has an area greater than or equal to about 70% and less than about 100% in a region surrounded by the split slit, the first tip, and the second tip.

15. The transducer according to claim 1, wherein the first connection portion is connected to the center of the first tip and the center of the second tip.

16. The transducer according to claim 1, wherein the first connection portion is connected to the center of the first tip and an end of the second tip closer to the first beam.

17. The transducer according to claim 1, wherein the first connection portion is connected to an end of the first tip closer to the second beam and an end of the second tip closer to the first beam.

18. The transducer according to claim 1, further comprising:

a third beam adjacent to the second beam in the circumferential direction of the base, including a third fixed end connected to the base and a third tip located closer to the center of the base on a side opposite to the third fixed end, and extending from the third fixed end towards the third tip;

a fourth beam adjacent to each of the third beam and the first beam in the circumferential direction of the base, including a fourth fixed end connected to the base and a fourth tip located closer to the center of the base on a side opposite to the fourth fixed end, and extending from the fourth fixed end towards the fourth tip;

a second connection portion connecting the second tip and the third tip to each other;

a third connection portion connecting the third tip and the fourth tip to each other; and a fourth connection portion connecting the fourth tip and the first tip to each other; wherein the second connection portion is surrounded by the split slit connecting the center of the second tip, the center of the base, and a center of the third tip, the second tip, and the third tip;

the third connection portion is surrounded by the split slit connecting the center of the third tip, the center of the base, and a center of the fourth tip, the third tip, and the fourth tip; and the fourth connection portion is surrounded by the split slit connecting the center of the fourth tip, the center of the base, and the center of the first tip, the fourth tip, and the first tip.

19. The transducer according to claim 1, wherein each of the first beam and the second beam includes:

a piezoelectric layer made of a single crystal piezoelectric body;

a first electrode layer on one side of the piezoelectric layer; and a second electrode layer on another side of the piezoelectric layer so as to be opposed to at least a portion of the first electrode layer with the piezoelectric layer interposed therebetween.

20. The transducer according to claim 19, wherein an axial direction of a virtual axis when a polarization axis of the single-crystal piezoelectric body is projected from a multilayer direction onto a virtual plane orthogonal or substantially orthogonal to the multilayer direction of the piezoelectric layer, the first electrode layer, and the second electrode layer extends in a same or substantially a same direction in both the first beam and the second beam, and intersects with an extending direction of each of the first beam and the second beam when viewed from the multilayer direction.

21. The transducer according to claim 20, wherein an angle between the axial direction of the virtual axis and the extending direction of each of the first beam and the second beam is greater than or equal to about 40 degrees and less than or equal to about 50 degrees, or greater than or equal to about 130 degrees and less than or equal to about 140 degrees when viewed from the multilayer direction.

* * * * *